United States Patent
Kitazawa et al.

(10) Patent No.: US 7,472,581 B2
(45) Date of Patent: Jan. 6, 2009

(54) VACUUM APPARATUS

(75) Inventors: Takashi Kitazawa, Nirasaki (JP);
Atsushi Kobayashi, Nirasaki (JP);
Kazuyuki Tezuka, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 214 days.

(21) Appl. No.: 11/368,479

(22) Filed: Mar. 7, 2006

(65) Prior Publication Data
US 2006/0207314 A1 Sep. 21, 2006

Related U.S. Application Data

(60) Provisional application No. 60/698,018, filed on Jul. 12, 2005, provisional application No. 60/666,716, filed on Mar. 31, 2005.

(30) Foreign Application Priority Data

Mar. 16, 2005 (JP) .............................. 2005-074714
Jun. 16, 2005 (JP) .............................. 2005-175909

(51) Int. Cl.
*G01M 3/04* (2006.01)
(52) U.S. Cl. ...................................................... 73/49.2
(58) Field of Classification Search ................ 73/40.7, 73/49.2
See application file for complete search history.

(56) References Cited

U.S. PATENT DOCUMENTS 4,765,933 A * 8/1988 Nagashima ................ 261/44.6
5,821,404 A * 10/1998 Bohm et al. .................. 73/40.7
5,900,537 A * 5/1999 Bohm et al. .................. 73/40.7
5,953,634 A * 9/1999 Kajita et al. ................ 438/687
6,415,650 B1 * 7/2002 Bohm et al. .................. 73/40.7

FOREIGN PATENT DOCUMENTS

| JP | 61-2327 | * | 1/1986 |
| JP | 63-21334 | * | 1/1988 |
| JP | 6-224097 | * | 8/1994 |
| JP | 7-190203 |   | 7/1995 |
| JP | 11-335843 |   | 12/1999 |
| JP | 2003-77898 |   | 3/2003 |

* cited by examiner

*Primary Examiner*—Daniel S Larkin
(74) *Attorney, Agent, or Firm*—Oblon, Spivak, McClelland, Maier & Neustadt, P.C.

(57) ABSTRACT

A leak rate measuring method measures a leak rate of a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction. In the leak rate measuring method, there is provided a circulating path branched from a gas exhaust path between the first gas exhaust pump and the second valve and connected to the vacuum pump to communicate therewith. The pressure inside the vacuum chamber is monitored by circulating a gas into the vacuum chamber through the circulating path with first gas exhaust pump under the condition that the first valve is set at a predetermined conductance and the second valve is closed.

11 Claims, 18 Drawing Sheets

VACUUM APPARATUS

FIELD OF THE INVENTION

The present invention relates to a vacuum apparatus for performing an etching process, a film forming process or the like on an object to be processed such as a semiconductor wafer, a method for measuring a leak rate thereof, and a program and a storage medium used in the measurement of the leak rate.

BACKGROUND OF THE INVENTION

A vacuum apparatus for performing an etching process, a film forming process or the like in manufacturing various semiconductor devices includes a gas exhaust unit having a valve and a gas exhaust pump. Further, in the vacuum apparatus, a pressure inside a vacuum chamber can be depressurized to a desired vacuum state.

To be specific, a conductance variable adaptive pressure control (APC) valve, a gate valve, a turbo-molecular pump (TMP) as a main gas exhaust pump, a valve and a dry pump as an auxiliary gas exhaust pump are connected to each other in that order from the side of the vacuum chamber, so that the vacuum chamber can be maintained in a high airtight state and a vacuum state. Moreover, there may also be used an APC value having a gate valve mechanism in which the APC valve and the gate valve are integrally formed.

In such vacuum apparatus, airtightness needs to be checked by regularly measuring a leak rate of the vacuum chamber. The leak rate is measured by using a buildup method for measuring a pressure inside the vacuum chamber and monitoring its variation, the chamber being vacuum-exhausted and sealed by exhausting gas therefrom (see, e.g., Japanese Patent Laid-open Application NO. 2003-77898 (e.g., FIG. 4)). In order to measure the leak rate by using the buildup method, the vacuum chamber needs to be sealed. Accordingly, the gate valve (or the APC valve having the gate valve mechanism) is provided at an upstream side of the turbo-molecular pump in a gas flowing direction.

The gate valve and the APC valve having the gate valve mechanism use an O-ring as a seal member for securing an airtight state. However, in the vacuum apparatus for performing processes using a plasma, the O-ring is easily degraded by radicals generated during a dry cleaning process or the like and thus needs to be replaced frequently. A maintenance work of the O-ring requires a long time due to a recent trend towards a large diameter of a gas exhaust line, which leads to an increased downtime of the apparatus.

A main purpose of disposing the gate valve near the APC valve (or the gate valve integrated with the APC valve) at the gas exhaust unit of the vacuum apparatus is to seal the inner space of the vacuum chamber when measuring a leak rate by using the buildup method. However, if the leak rate is measured by another method wherein the gate valve is not required, the number of maintenance works required for replacing the O-ring can be greatly reduced.

SUMMARY OF THE INVENTION

It is, therefore, a primary object of the present invention to provide a leak rate measuring method capable of precisely measuring a leak rate from a vacuum chamber without a gate valve. It is another object of the present invention to provide a vacuum apparatus having no gate valve at an upstream side of a turbo-molecular pump in a gas flowing direction to thereby reduce the number of maintenance works.

In accordance with a first aspect of the present invention, there is provided a method for measuring a leak rate of a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction, the method including the steps of: providing a circulating path branched from a gas exhaust path between the first gas exhaust pump and the second valve, the circulating path being connected to the vacuum pump to communicate therewith; and monitoring a pressure inside the vacuum chamber by circulating a gas into the vacuum chamber through the circulating path with the use of the first gas exhaust pump under the condition that the first valve is set at a predetermined conductance and the second valve is closed.

In accordance with a second aspect of the present invention, there is provided a method for measuring a leak rate of a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction, the method including the step of: closing the second valve and monitoring a pressure inside a gas exhaust path between the first gas exhaust pump and the second valve under the condition that the first valve is fully opened and the first gas exhaust pump is operated.

In accordance with a third aspect of the present invention, there is provided a method for measuring a leak rate of a vacuum apparatus including a vacuum chamber in which an object is accommodated to be processed, a first gas exhaust pump connected to the vacuum chamber via a first valve serving as a conductance variable valve, and a second gas exhaust pump connected to the first gas exhaust pump via a second valve, the method including the step of: closing the second valve after depressurizing an inner space of the vacuum chamber with the second gas exhaust pump to a pressure equal to or less than a predetermined level and then monitoring a pressure inside the vacuum chamber under the condition that the first valve is fully opened and the first gas exhaust pump is stopped.

In accordance with a fourth aspect of the present invention, there is provided a method for measuring a leak rate of a vacuum apparatus including a vacuum chamber in which an object is accommodated to be processed, a first gas exhaust pump connected to the vacuum chamber via a first valve serving as a conductance variable valve, and a second valve connected to a downstream of the first gas exhaust pump in a gas flowing direction, the method comprising the steps of: setting the first valve at a predetermined conductance and monitoring a pressure inside the vacuum chamber under the condition that the first gas exhaust pump is operated and the second valve is opened.

In the measuring method of the fourth aspect, the leak rate may be calculated by comparing the measured pressure with a pre-calculated pressure value inside the vacuum chamber when the first valve is set at the predetermined conductance. Further, the predetermined conductance is preferably smaller than or equal to 10 L/sec.

In a conventional arrangement, in order to measure a leak rate of the vacuum chamber, a gate valve is provided at an upstream side of the first exhaust pump in the gas flowing direction and the vacuum chamber is sealed.

In other words, in the conventional arrangement, the leak rate is measured by a buildup method under the condition that the gate valve is provided adjacent to a conductance variable valve or a conductance variable valve having a gate valve mechanism is used and the vacuum chamber is sealed by closing the gate valve. However, in accordance with any one of the aforementioned aspects, the leak rate can be measured without using the gate valve mechanism, so that there is no need to provide the gate valve mechanism at the upstream side of the first exhaust pump in the gas flowing direction.

In accordance with a fifth aspect of the present invention, there is provided a vacuum apparatus including: a vacuum chamber in which an object is accommodated to be processed, a first gas exhaust pump connected to the vacuum chamber via a first valve serving as a conductance variable valve having no gate valve mechanism; and a second valve connected to a downstream side of the first gas exhaust pump in a gas flowing direction.

In accordance with the fifth aspect, since no gate valve is provided at the upstream side of the first exhaust pump, the vacuum apparatus can be achieved without using a readily degradable O-ring necessary for the gate valve mechanism. Accordingly, it is possible to reduce the number of the components as well as the time and costs required for the maintenance such as the replacement of the O-ring, so that the safety of the apparatus can be enhanced.

In the fifth aspect, the apparatus may further include a second gas exhaust pump connected to a downstream side of the second valve in the gas flowing direction. In this case, preferably, the first gas exhaust pump is a turbo-molecular pump and the second gas exhaust pump is a dry pump. Further, preferably, the first valve has a valve body composed of a pair of approximately semicircular symmetric plates, and a conductance of the first valve is variable by rotating the pair of plates about linear sides thereof to adjust an opening degree.

The vacuum apparatus may further include a circulating path branched from a gas exhaust path between the first gas exhaust pump and the second valve, the circulating path being connected to the vacuum chamber to communicate therewith.

In accordance with a sixth aspect of the present invention, there is provided a program, executed on a computer, for measuring a leak rate in a vacuum apparatus including a vacuum chamber in which an object is accommodated to be processed, a first gas exhaust pump connected to the vacuum chamber via a first valve serving as a conductance variable valve, a second valve connected to a downstream side of the first gas exhaust pump in a gas flowing direction, and a circulating path branched from a gas exhaust path between the first gas exhaust pump and the second valve, the circulating path being connected to the vacuum chamber to communicate therewith, the program including: a module for setting the first valve to a predetermined opening degree; a module for circulating gas in the vacuum chamber through the circulating path with the use of the first gas exhaust pump under the condition that the second valve is closed; and a module for monitoring a pressure inside the vacuum chamber.

In accordance with a seventh aspect of the present invention, there is provided a program, executed on a computer, for measuring a leak rate in a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction, the program including: a module for closing the second valve under the condition that the first valve is fully opened and the first gas exhaust pump is operated; and a module for monitoring a pressure inside a gas exhaust path between the first gas exhaust pump and the second valve.

In accordance with an eighth aspect of the present invention, there is provided a program, executed on a computer, for measuring a leak rate in a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction, the program including: a module for decompressing an inner space of the vacuum chamber under a predetermined pressure with the second gas exhaust pump under the condition that the first valve is fully opened and the first gas exhaust pump is stopped; a module for substantially closing the second valve; and a module for monitoring a pressure inside the vacuum chamber while the second valve is closed.

In accordance with a ninth aspect of the present invention, there is provided a program, executed on a computer, for measuring a leak rate in a vacuum apparatus including a vacuum chamber in which an object is accommodated to be processed, a first gas exhaust pump connected to the vacuum chamber via a first valve serving as a conductance variable valve, and a second valve connected to a downstream side of the first gas exhaust pump in a gas flowing direction, the program including: a module for setting the first valve to a predetermined opening degree under the condition that the first gas exhaust pump is operated and the second valve is opened; and a module for monitoring a pressure inside the vacuum chamber.

The program may further include a module for calculating a leak rate, by comparing the measured pressure with a pre-calculated pressure inside the vacuum chamber when the first valve is set to a predetermined opening degree.

In accordance with a tenth aspect of the present invention, there is provided a storage medium readable by a computer storing the program described in any one of the sixth to the ninth aspect of the present invention.

In accordance with an eleventh aspect of the present invention, there is provided a vacuum apparatus having a vacuum chamber in which an object is accommodated to be processed, wherein the vacuum apparatus is connected to a controller for performing the leak rate measuring method described in any one of the first to the fourth aspect of the present invention in the vacuum chamber.

In accordance with a twelfth aspect of the present invention, there is provided a vacuum processing system including: a plurality of vacuum apparatuses described in the eleventh aspect of the present invention; and a general control unit for controlling the overall vacuum processing system, the general control unit being connected to the controller.

In accordance with the present invention, the leak rate of the vacuum chamber can be measured without providing a gate valve adjacent to the conductance variable valve or a gate valve integrated with the conductance variable valve (APC valve having a gate valve mechanism). Accordingly, maintenance work of a readily degradable O-ring required for the gate valve mechanism becomes unnecessary. As a result, it is possible to reduce a downtime of an apparatus and a cost required for the maintenance work.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
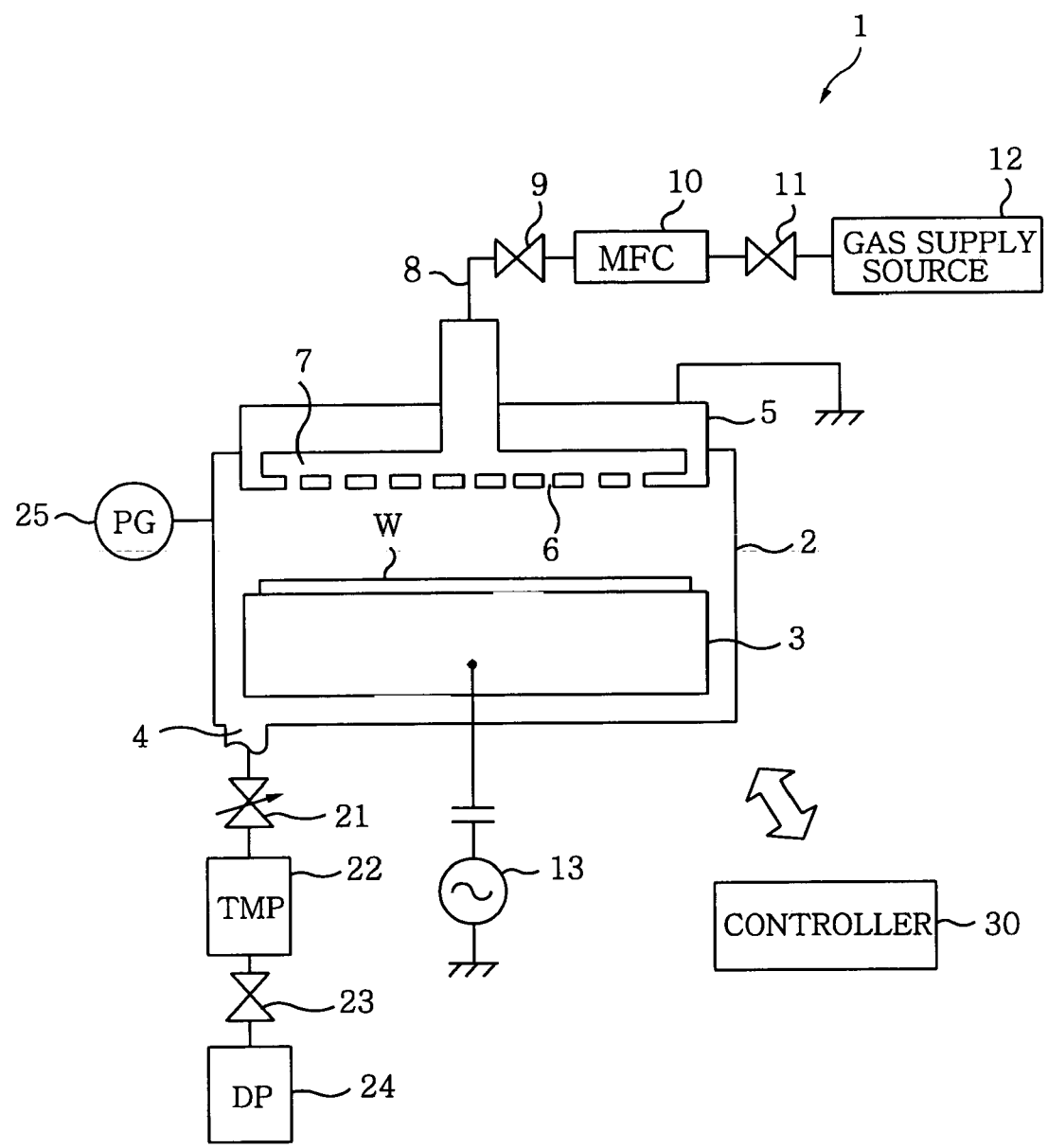
FIG. 1 is a schematic diagram of a vacuum apparatus of the present invention.

Hereinafter, preferred embodiments of the present invention will be described in detail with reference to the accompanying drawings. FIG. 1 shows a schematic view of a vacuum apparatus 1 in accordance with a first preferred embodiment of the present invention. The vacuum apparatus 1 is configured as a parallel plate type plasma processing apparatus having a pair of electrode plates vertically facing each other in parallel and is suitable for an etching process or the like in manufacturing a semiconductor device.

In a vacuum chamber 2 of the vacuum apparatus 1, there is provided a susceptor 3 serving as a lower electrode as well as a mounting table of a semiconductor wafer (hereinafter, referred to as 'wafer') as an object to be processed. Provided above the susceptor 3 in parallel is a grounded shower head 5 serving as an upper electrode. A gap between the susceptor 3 and the shower head 5 can be adjusted by an elevating mechanism (not shown) installed at the susceptor 3.

A gas supply line 8 is connected to the shower head 5 and also to a gas supply source 12 via a valve 9, a flow rate controller 10 and a valve 11. Although a single gas supply source 12 is illustrated in FIG. 1, a plurality of gas supply sources can be disposed depending on types of processing gases. A gas from the gas supply source 12 is fed to a gas supply space 7 in the shower head 5 via the gas supply line 8 and then uniformly injected into the vacuum chamber 2 through gas injection openings 6.

A high frequency power supply 13 is connected to the susceptor 3 serving as a lower electrode via a matching unit (not shown). The high frequency power supply 13 can supply a high frequency power of a specified frequency to the susceptor 3 serving as the lower electrode.

A gas exhaust port 4 is formed at a bottom portion of the vacuum chamber 2. Further, an APC valve 21 as a conductance variable valve, a turbo-molecular pump 22 as a first gas exhaust pump, a valve 23 as a second valve and a dry pump (DP) as a second gas exhaust pump are connected to the gas exhaust port 4 in that order, thereby forming the gas exhaust unit. As described above, in the vacuum apparatus 1 of this embodiment, there is eliminated a gate valve which would be disposed near the conductance variable valve at an upstream side of the turbo-molecular pump 22 in a gas flowing direction in a conventional case (or the conductance variable valve has no gate valve mechanism). Such configuration enables a reduction of maintenance work, such as a replacement of an easily degradable O-ring necessary for the gate valve (the conductance variable valve having the gate valve mechanism). Accordingly, it is possible to greatly reduce a frequency and time for the apparatus to stop for the maintenance work, and further to suppress costs required for exchanging components and stopping the apparatus. Moreover, since a gas leak from the degraded O-ring can be prevented, a safety of the vacuum apparatus is enhanced.

The APC valve 21 is configured to be able to automatically control a pressure by varying a conductance via a controller 30 (to be described later) based on a pressure value measured by a pressure gauge (PG) 25 for measuring a pressure inside the vacuum chamber 2.

Figure 2:
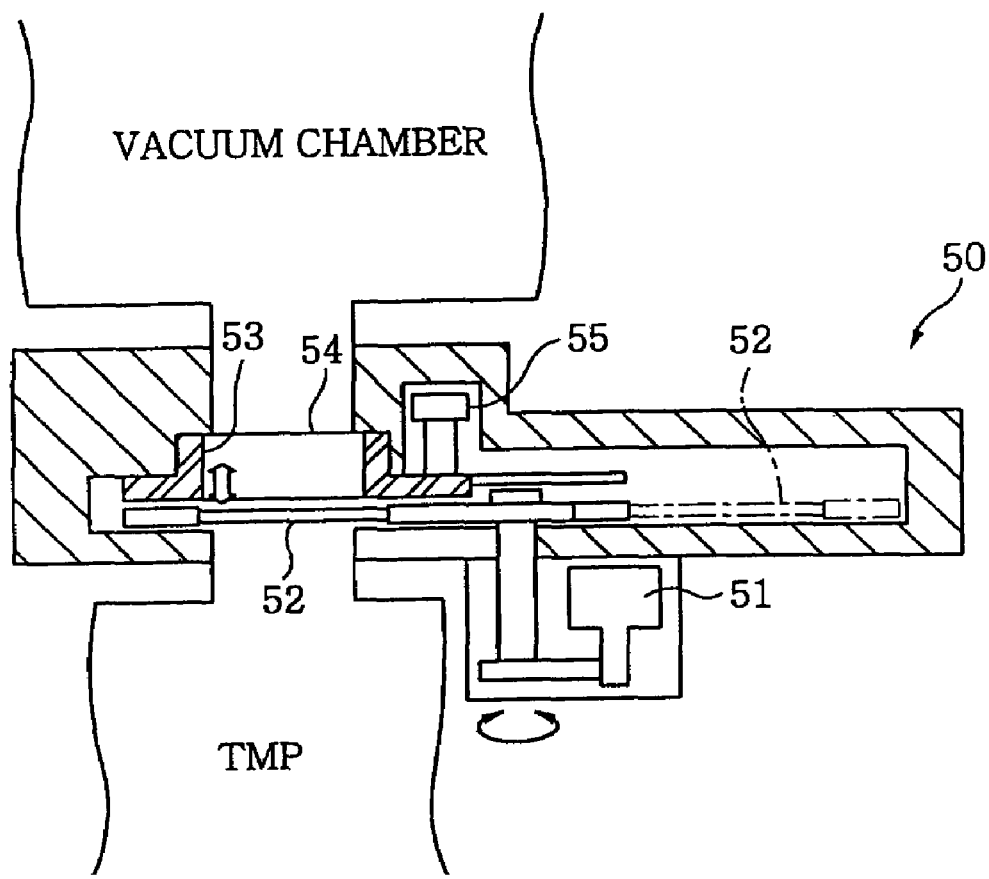
FIG. 2 shows a cross sectional view illustrating a schematic composition of an APC valve having a gate valve mechanism.

Meanwhile, as for the conductance variable valve having the gate valve mechanism, there has been conventionally used a pendulum valve 50 shown in FIG. 2, for example. In the pendulum valve 50, a plate (valve body) 52 is horizontally moved forward into and backward from a gas exhaust path by a stepper motor 51, thereby controlling a conductance. In case the pendulum valve 50 serves as a gate valve, a locking ring 54 having the O-ring 53 is lowered by a plunger 55, thereby blocking the gas exhaust path.

Figure 3A:
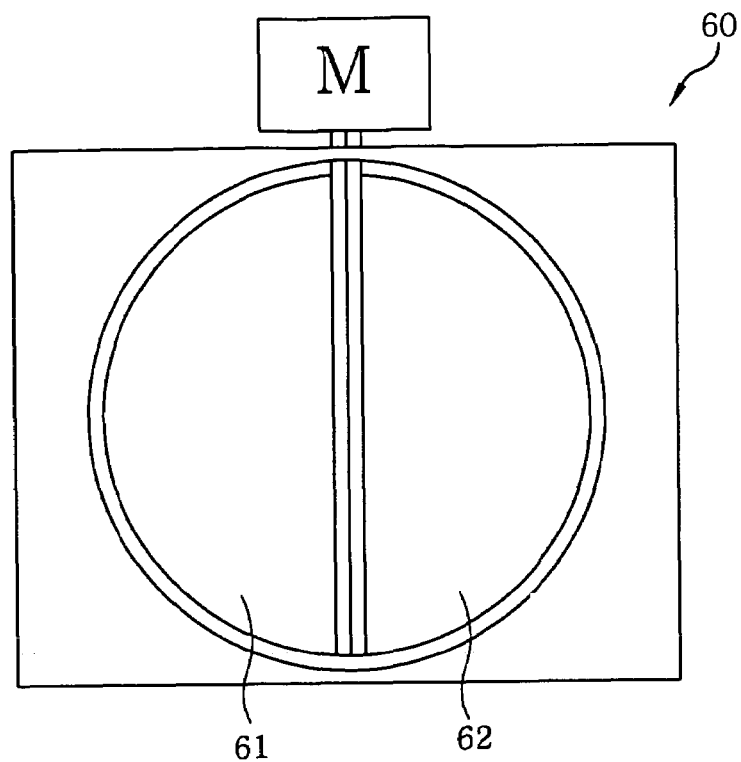
FIGS. 3A and 3B are a top view and a cross sectional view schematically showing a butterfly valve which is disposed adjacent to a turbo-molecular pump.
Figure 3B:
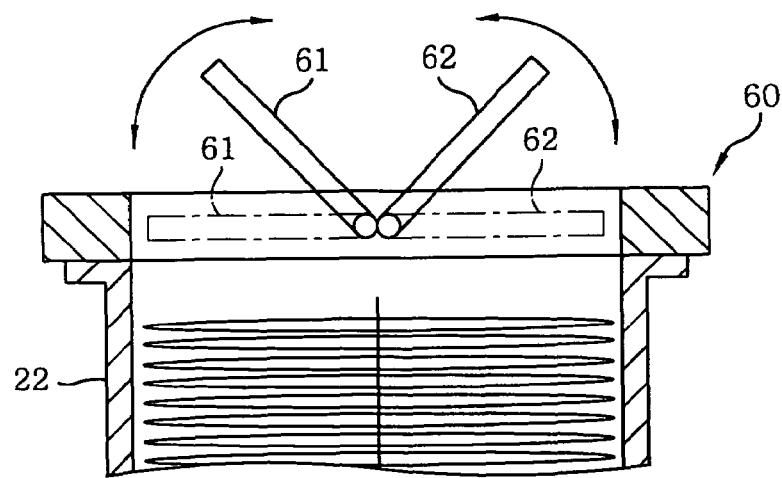

However, since the function of the gate valve is unnecessary in the vacuum apparatus 1 of this embodiment, various conductance variable valves may be employed. For example, there can be used a butterfly valve 60 having a valve body composed of a pair of approximately semicircular symmetric plates 61 and 62 as shown in FIG. 3A. Herein, an opening degree of the butterfly valve 60 is controlled by rotating the semicircular plates 61 and 62 about respective linear sides corresponding to their chords, so that a conductance can be variably controlled. The butterfly valve 60 has a structure of controlling its opening degree with the plates 61 and 62 standing slanted at a certain angle toward the same side (e.g., toward the upstream side of the gas flowing direction). Accordingly, the turbo-molecular pump 22 can be disposed immediately under the butterfly valve 60 as shown in FIG. 3B, for example. Further, since a size in direction perpendicular to a cross section of the gas exhaust path can be decreased, an installation space can be greatly reduced compared with the pendulum conductance variable valve illustrated in FIG. 2.

In the vacuum apparatus 1 configured as described above, a wafer W is mounted on the susceptor 3 and, then, an inner space of the vacuum chamber 2 is exhausted to a high vacuum state by using the turbo-molecular pump 22 and the dry pump 24. In such state, an etching gas is supplied from the gas supply source 12 into the vacuum chamber 2 while a flow rate thereof is controlled at a predetermined level. Then, by applying a high frequency power to the susceptor 3 serving as the lower electrode, a high frequency electric field is generated inside the vacuum chamber 2. Accordingly, the etching gas is plasmarized, so that an etching process can be performed on the wafer W.

Moreover, in the vacuum apparatus 1 of FIG. 1, the dry pump 24 is disposed at a secondary side (a downstream side in the gas flowing direction) of the turbo-molecular pump 22 via a line. Since a purge gas such as $N_2$ or the like is supplied to the turbo-molecular pump 22 via a purge gas line (not shown in FIG. 1) at a fixed flow rate, a pressure value (back pressure value) of the secondary side of the turbo-molecular pump 22 is determined by a performance of the dry pump 24 and a length of a line from the turbo-molecular pump 22 to the dry pump 24. However, when a gas such as $H_2$ or the like, which is difficult to flow smoothly, is exhausted with gases to be supplied from the gas supply source 12 of the vacuum apparatus 1 to the vacuum chamber 2, the pressure at an inlet port of the turbo-molecular pump 22 may change by effects of the back pressure value of the turbo-molecular pump 22.

Figure 4:
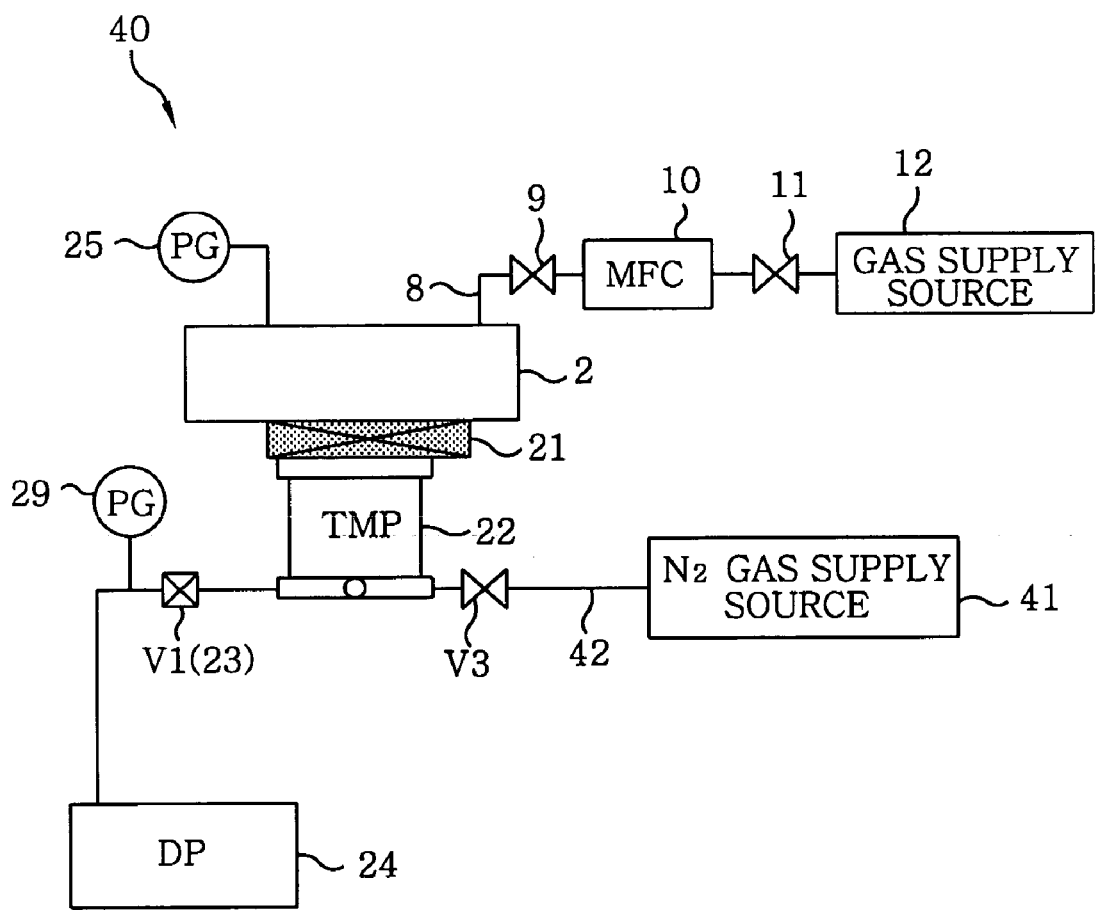
FIG. 4 presents a schematic diagram of a modification of the vacuum apparatus.

To that end, as a modification of the vacuum apparatus 1 of FIG. 1, there may be provided a vacuum apparatus 40 shown in FIG. 4 wherein a sensor 29 such as a pressure gauge for monitoring a back pressure of the turbo-molecular pump 22 is provided at a downstream side of a valve 23 as a second valve, and a valve V3 having a flow rate control function is provided at a purge gas line 42 for feeding a purge gas to the turbo-molecular pump 22. Accordingly, when $N_2$ gas as the purge gas is supplied from an $N_2$ gas supply source 41 to the turbo-molecular pump 22 via the valve V3, the back pressure of the turbo-molecular pump 22 is monitored by the sensor 29. Further, based on the measured pressure value, it is possible to control the flow rate of the $N_2$ gas and the back pressure of the turbo-molecular pump 22 with the valve V3.

In other words, in the vacuum apparatus 40 configured as illustrated in FIG. 4, by varying a purge amount of $N_2$ gas supplied to the turbo-molecular pump 22 with a cooperative feedback control of the sensor 29 and the valve V3, the back pressure of the turbo-molecular pump 22 can be uniformly controlled. Furthermore, with such configuration, a pressure control inside the vacuum chamber 2 can be stably performed by suppressing the change of the pressure at the inlet port of the turbo-molecular pump 22, which would be caused by the affects (e.g., a length of the line, a performance of the dry pump 24 or the like) of a secondary gas exhaust system of the turbo-molecular pump 22.

Figure 5:
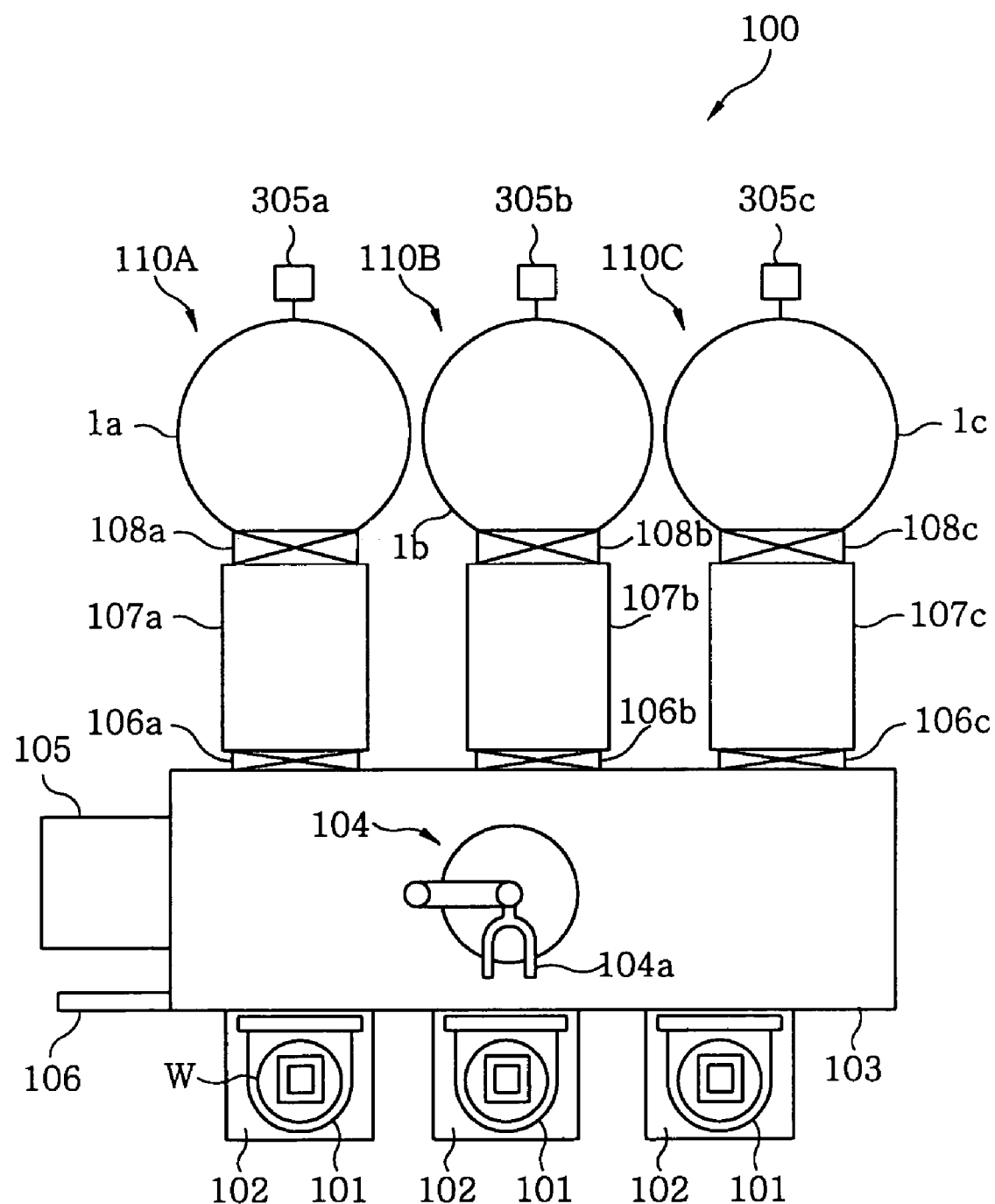
FIG. 5 represents a schematic view of a vacuum processing system having the vacuum apparatus.

FIG. 5 provides a top view schematically showing a vacuum processing system 100 including the vacuum apparatus 1 of FIG. 1. The vacuum processing system 100 is configured such that an etching process or the like can be performed on the wafer W as an object to be processed under a predetermined vacuum state.

The vacuum processing system 100 includes three process ships 110A, 110B and 110C, and the process ships 110A, 110B and 110C have vacuum apparatuses 1 (1a, 1b and 1c), respectively. Since the process ships 110A to 110C have the same composition, the process ship 110A will be described as an example hereinafter.

The process ship 110A includes a vacuum apparatus 1a, a load-lock chamber 107a and a gate valve 108a interposed therebetween.

Connected to the vacuum apparatus 1a is a module controller (hereinafter, referred to as 'MC') 305a for controlling a pressure inside the vacuum chamber 2. A description on the MC 305a will be provided later. Further, a loader unit 103 is provided at an opposite side to the vacuum apparatus 1a of the load-lock chamber 107a via a gate valve 106a. Moreover, three FOUP mounting tables 102 are provided at an opposite side to the load lock chamber 107a of the loader unit 103 via three connecting ports (not shown) to which respective FOUPs 101 capable of accommodating therein the wafers W are attached.

The vacuum apparatus 1a communicates with the load-lock chamber 107a by opening the gate valve 108a, whereas it is isolated from the load-lock chamber 107a by closing the gate valve 108a. Further, the load-lock chamber 107a communicates with the loader unit 103 by opening the gate valve 106a, whereas it is isolated from the loader unit 03 by closing the gate valve 106a. Besides, there is provided in the load-lock chamber 107a a wafer transfer mechanism (not shown) for loading/unloading the wafer W as an object to be processed between the vacuum apparatus 101a and the loader unit 103.

An HEPA filter (not illustrated) is -provided at a ceiling portion of the loader unit 103. Clean air passing through the HEPA filter is supplied into the loader unit 103 to flow downwardly, and the wafer W is loaded/unloaded under an atmospheric ambience of clean air. In addition, an orienter 105 is provided at one side of the loader unit 103 and performs a position alignment of the wafer W.

The loader unit 103 has therein a wafer transfer mechanism 104 for loading/unloading the wafer W between the FOUPs 101 and the load-lock chambers 107a. The wafer transfer mechanism 104 has a multi-joint arm structure and transfers the wafer W while mounting the wafer W on a pick 104a formed at a leading end of the multi-joint arm.

Further, the vacuum processing system 100 has a user interface 106 disposed at one lengthwise end of the loader unit 103. The user interface 106 includes an input unit (keyboard) and a display unit (monitor) composed of, e.g., a liquid crystal display (LCD). The corresponding display unit displays thereon an operational status of each component of the vacuum processing system 100.

Figure 6:
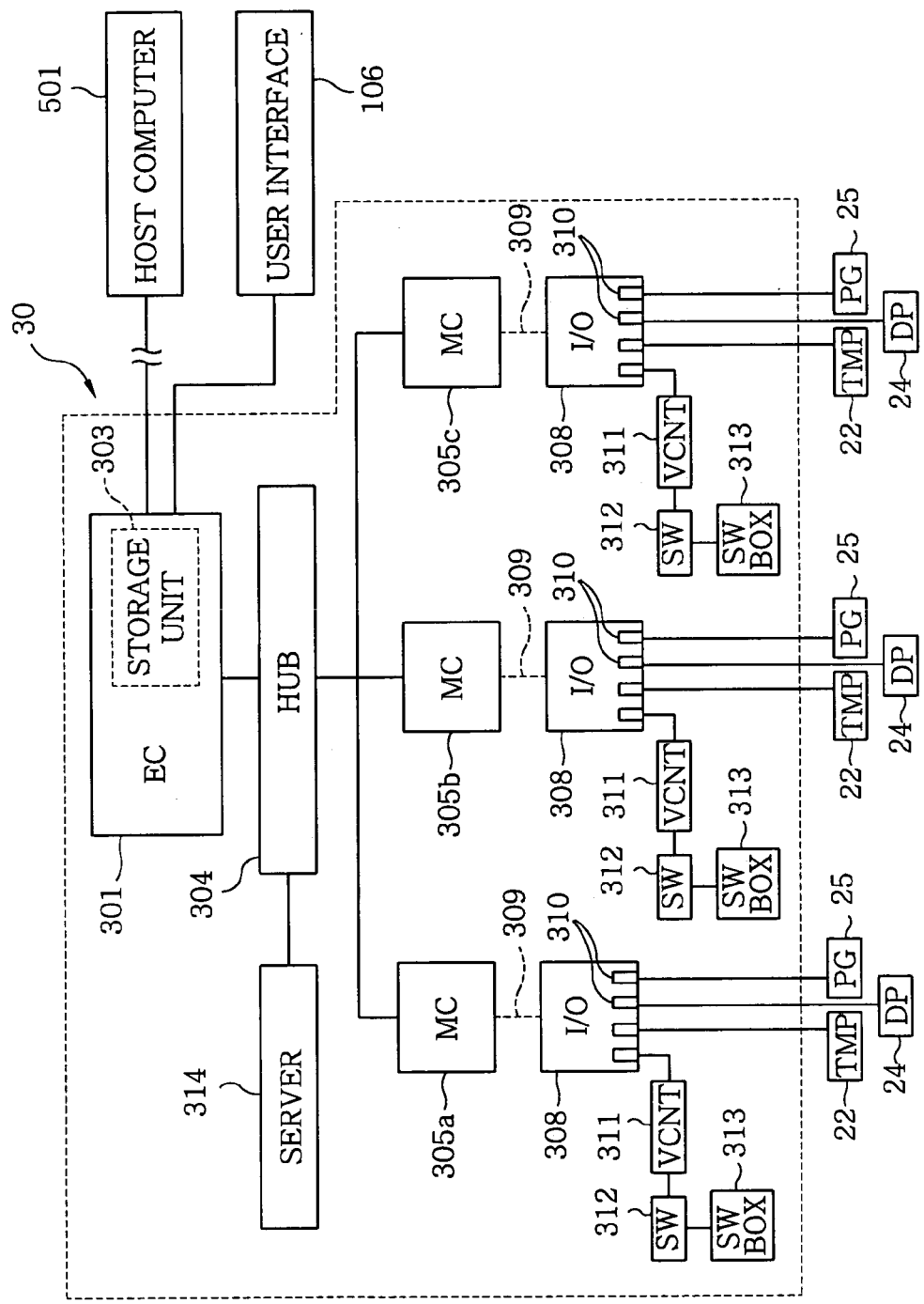
FIG. 6 offers a schematic diagram of a controller.

A controller 30 (see FIG. 1) controls the entire vacuum processing system 100, a pressure in the vacuum chamber 2 of the vacuum apparatus 1 and the like. FIG. 6 shows a schematic composition of the controller 30. As shown in FIG. 6, the controller 30 includes an equipment controller (EC) 301 as a general control unit, a plurality of, e.g., three MCs 305a, 305b and 305c provided correspondingly to the vacuum apparatuses 1, and a switching hub 304 for connecting the EC 301 and the MCs 305a to 305c. Moreover, the MC may also be provided at the load-lock chambers 107a to 107c or the loader unit 103 as well as at the vacuum apparatuses 1a to 1c, and they are controlled by the EC 301, but an illustration and an explanation thereof will be omitted.

In addition, the controller 30 is connected to a host computer 501 serving as a manufacturing execution system (MES) for managing an overall manufacturing process of a factory in which the vacuum processing system 100 is installed via a local area network (LAN) from the EC 301. The host computer 501 feedbacks in real time information on factory processes to a basic operation system (not illustrated) in cooperation with the controller 30 and also determines the processes by considering an overall load of the factory or the like.

The EC 301, i.e., the general control unit for controlling an overall operation of the vacuum processing system 100 by integrating the respective MCs 305a to 305c, is provided with a CPU (not shown) and a storage unit 303 such as RAM, HDD or the like. Further, the EC 301 is configured to control the processes in the process ships 110A to 110C by the CPU reading from the storage unit 303 a program (including position information of a measuring point) corresponding to a wafer processing method (i.e., a recipe including a pressure condition) specified by a user through the user interface 106 and then transmitting a control program corresponding to the recipe to the MCs 305a to 305c.

The MCs 305a to 305c are typical controllers for controlling operations of the respective process ships 110A to 110C. The MCs 305a to 305c are connected to respective I/O (input/output) modules 308 via a network 309 implemented by an LSI referred to as a general high-speed optimum scalable transceiver (GHOST). In the GHOST network 309, the MCs 305a to 305c correspond to master nodes, and the I/O modules 308 correspond to slave nodes.

The I/O module 308 has a plurality of I/O units 310 (only four are shown) connected to each component (end device) related to a pressure control inside the vacuum chamber 2 and transfers a control signal to the end device and an output signal from the end device. Herein, the end device related to the pressure control may include the turbo-molecular pump 22, the dry pump 24, the pressure sensor (pressure gauge 25 or the like) and various valves (APC valve 21, the valve 23, the valve V3 and the like), for example. FIG. 6 representatively shows connections between some of the end devices and the respective I/O devices 310 for the convenience. Furthermore, connected to the GHOST network 309 is an I/O port (not illustrated) for controlling an input/output of a digital signal, an analog signal and a serial signal in the I/O unit 310.

The switching hub 304 switches the MCs 305a to 305c, to which the EC 301 is connected, depending on the control signal from the EC 301.

As described above, the MCs 305a to 305c collect pressure values inside the vacuum chamber 2 measured by the pressure gauge 25 in the respective process ships 1a to 1c. Moreover, the MCs 305a to 305c control the pressure inside the vacuum chamber 2 by varying a conductance of the APC valve 21 based on the corresponding pressure value, turning on/off the turbo-molecular pump 22 and the dry pump 24, and opening/closing various valves (the valve 23, the valve V3 and the like).

For instance, each of the respective MCs 305a to 305c is configured to exchange various signals or alarms for driving/stopping the turbo-molecular pump 22 and the dry pump 24 via the I/O module 308. Accordingly, if a pump status signal or an alarm signal is transmitted from the turbo-molecular pump 22 and the dry pump 24 to the I/O module 308, it is switched into a serial signal in the I/O unit 310 and then transferred to a switch box (SW BOX) 313 via a local GHOST line, a valve count unit (VCNT) 311 and a switch unit (SW) 312. Consequently, a display unit such as a light emitting diode (LED) of the switch box 313 or the like is turned on/periodically turned on and off/turned off.

In the controller 30 illustrated in FIG. 6, instead of directly connecting the end devices to the EC 301, the I/O unit 310 connected to the end devices forms the I/O module 308. Since the I/O modules 308 are connected to the EC 301 via the respective MCs 305a to 305c and the switching hub 304, a communication system can be simplified.

Besides, the GHOST of the MCs 305a to 305c refers to the address of the I/O unit 310 in the control signal transmitted by the CPU of the MCs 305a to 305c, the control signal referring to an address of the I/O unit 310 connected to a desired end device and that of the I/O module 308 including the corresponding I/O unit 310. Accordingly, the switching hub 304 or the like does not have to inquire a control signal's source of the CPU, so that the control signal can be efficiently transferred.

Moreover, the controller 30 may have a data collecting server 314 as a data collecting storage unit for economically collecting and storing data outputted from the pressure gauge 25 (see FIG. 1) serving as a pressure measuring unit. In this case, the data signal outputted as an analog signal from the pressure gauge 25 is inputted into the I/O unit 310 and then into the data collecting server 314 via the GHOST network 309 or the LAN.

In the vacuum processing system 100 configured as described above, first of all, a single wafer W taken out from any one of the FOUPs 101 is loaded into the orienter 105 by the wafer transfer mechanism 104 in the loader unit 103 maintained under the atmospheric ambience of clean air and, then, a position alignment of the wafer W is carried out. Next, the wafer W is loaded into any one of the load-lock chambers 107a to 107c and, then, the load-lock chamber is exhausted to vacuum. Thereafter, the wafer W in the load-lock chamber is loaded into a vacuum chamber 2 of any one of the vacuum apparatuses 1a to 1c by a wafer transfer mechanism (not shown) to thereby perform an etching process or the like thereon under a high vacuum state. Then, the wafer W is loaded into any one of the load-lock chambers 107a to 107c. After the inner space thereof is set to be under the atmospheric pressure, the wafer W is unloaded from the load-lock chamber by the wafer transfer mechanism 104 in the loader unit 103 and then accommodated in any one of the FOUPs 101. Such operation is carried out for the wafers W of one lot, and the processing for the same lot is then completed.

In accordance with the vacuum processing system 100 configured as described above, since there are provided the MCs 305a to 305c for performing the control under the EC 301 serving as the general control unit, it is possible to control the conductance of the APC valve 21 and the switching between operations and stops of the turbo-molecular pump 22 and the dry pump 24 with high reliability based on the pressure inside the vacuum chamber 2 measured by the pressure gauge 25.

Figure 7:
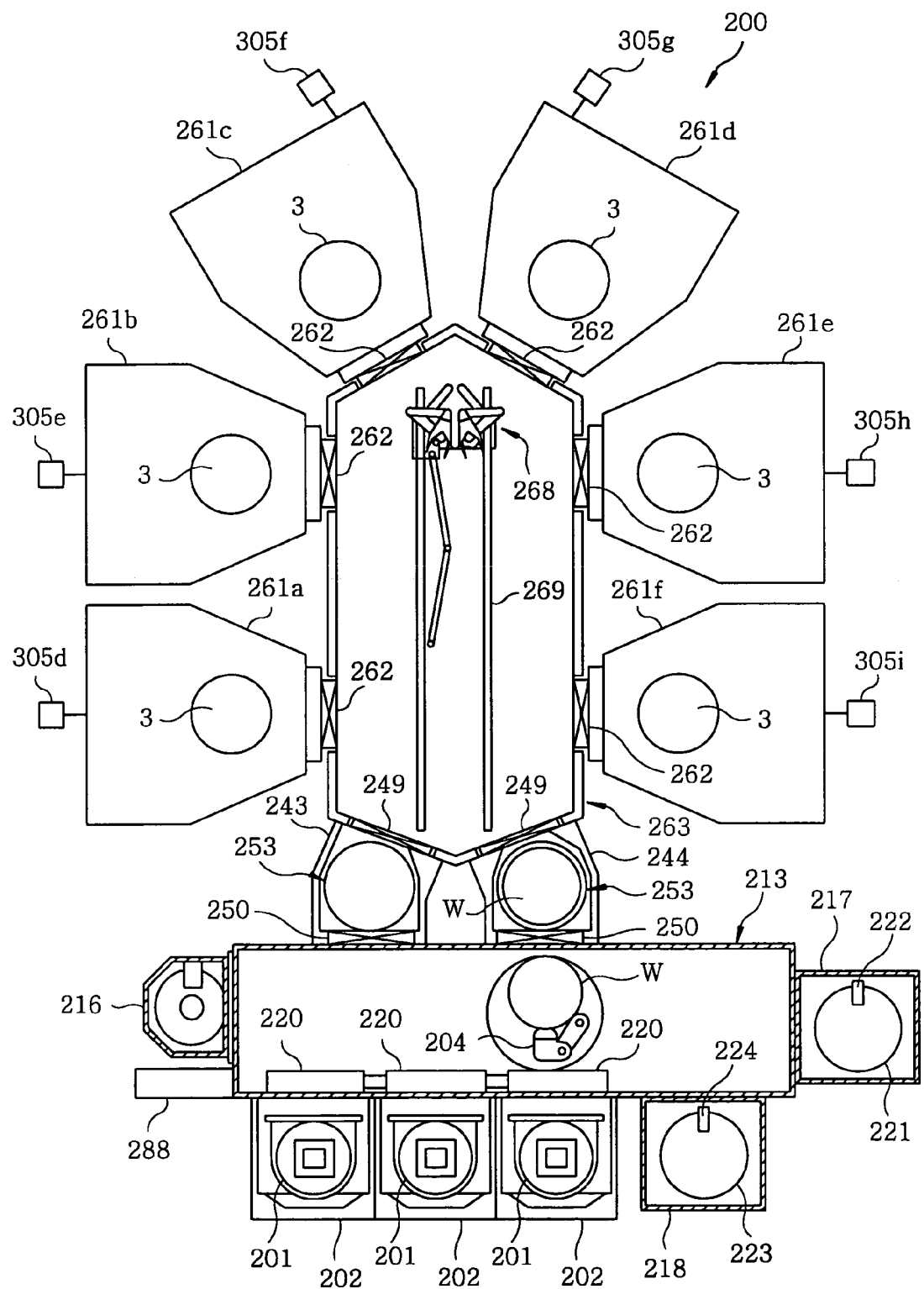
FIG. 7 illustrates a schematic view of another vacuum processing system.

FIG. 7 shows a schematic diagram of a vacuum processing system in accordance with another preferred embodiment different from that of FIG. 5. As illustrated in FIG. 7, a vacuum processing system 200 is a multi chamber type vacuum processing system having six process units (vacuum apparatuses) 261a to 261f disposed at four sides of an elongated hexagonal transfer unit 263. The process units 261a to 261f have the same configuration as that of the vacuum apparatus 1 of FIG. 1. Connected to the respective process units 261a to 261f are MCs 305d to 305i as module controllers for controlling the pressure inside the vacuum chamber 2. Since the MCs 305d to 305i have the same composition and function as those described above, a description thereof will be omitted (see FIG. 6).

Referring to FIG. 7, there is illustrated the substrate processing system 200 including: the hexagonal transfer unit 263 as viewed from above; the six process units 261a to 261f radially disposed around the transfer unit 263; a loader unit 213; two load-lock units 243 and 244 disposed between the transfer unit 263 and the loader unit 213, for connecting the transfer unit 263 and the loader unit 213.

In other words, the loader unit 213 is provided at an opposite side to the transfer unit 263 of the load-lock units 243 and 244. Further, three connecting ports 220 for attaching FOUPs 201 capable of accommodating therein wafers W are provided at an opposite side to the load-lock units 243 and 244 of the loader unit 213. The FOUPs 201 are mounted on FOUP mounting tables 202.

The pressures in the transfer unit 263 and the process units 261a to 261f are maintained at a vacuum state, and the transfer unit 263 is connected to the process units 261a to 261f via vacuum gate valves 262, respectively.

In the vacuum processing system 200, the inner pressure of the loader unit 213 is maintained at an atmospheric pressure, whereas that of the transfer unit 263 is maintained in a vacuum state. Accordingly, each of the load-lock units 243 and 244 is configured as a preliminary vacuum transfer chamber whose inner pressure can be controlled with a vacuum gate valve 249 provided at the connecting portion with the transfer unit 263 and an atmospheric door valve 250 provided at the connecting portion with the loader unit 213. Moreover, each of the load-lock units 243 and 244 has a wafer mounting table 253 for temporarily mounting thereon a wafer transferred between the loader unit 213 and the transfer unit 263.

Further, the transfer unit 263 has a transfer arm unit 268 composed of two scalar arm type transfer arms. The transfer arm unit 268 moves along a guide rail 269 disposed in the transfer unit 263 and also transfers the wafer W between the process units 261a to 261f and the load-lock units 243 and 244.

An HEPA filter (not illustrated) is provided at a ceiling portion of the loader unit 213. Clean air passing through the HEPA filter is supplied into the loader unit 213 to flow downwardly, and the wafer W is loaded/unloaded under an atmospheric ambience of clean air. In addition, an orienter 216 is provided at one side of the loader unit 213 and performs a position alignment of the wafer W.

The loader unit 213 has therein a wafer transfer mechanism 204 for loading/unloading the wafer W between the FOUPs 201 and the load-lock units 243 and 244. The wafer transfer mechanism 204 has a multi-joint arm structure and transfers the wafer W while mounting the wafer W on a pick (not shown) formed at a leading end of the multi-joint arm.

Further, the vacuum processing system 200 has a user interface 288 disposed at one lengthwise end of the loader unit 213. The user interface 288 includes an input unit (keyboard) and a display unit (monitor) composed of, e.g., a liquid crystal display (LCD). The corresponding display unit displays thereon an operational status of each component of the vacuum processing system 200.

An integrated metrology (IM) 217 is disposed at an opposite side of the orienter 216 with the loader unit 213 therebetween. The IM 217 is a measurement unit for accurately measuring a variation of a critical dimension (CD) or that of a film thickness of a gate insulating film, a capacitance insulating film or the like. Disposed at the IM 217 are a wafer mounting table 221 and a sensor 222. In case the CD value, for example, is measured, as for the sensor 222, a critical dimension measurement scanning electron microscope (CD-SEM), an electro beam holograph or the like can be used as well as an optical measuring device for measuring a pattern processing dimension on the wafer W. Further, in case the film thickness is measured, as for the sensor 222, there can be employed an X-ray photoelectron spectroscopy (XPS), an Auger electron spectroscopy (AES), a vacuum ultraviolet (VUV) ellipsometry or the like.

A particle inspection unit 218 is provided at a portion where the FOUPs 201 of the loader unit 213 are disposed. The particle inspection unit 218, i.e., a detection unit for detecting particles on a surface of the wafer W, includes a wafer mounting table 223 and an optical measuring unit 224 using of, e.g., a scattered light detection type, an optical phase comparison type.

The controller 30 (see FIG. 1) controls the overall vacuum processing system 200, the pressure inside the vacuum chamber 2 of the process units 261a to 261f and the like. Since the composition of the controller 30 has been described with reference to FIG. 6, the explanation thereof will be omitted.

In the vacuum processing system 200 configured as described above, the etching process or the like can be performed by loading a wafer W having a wafer mark formed thereon into any one of the process units 261a to 261f. Above all, a single wafer W taken out from any one of the FOUPs 201 is loaded into the orienter 216 by the wafer transfer mechanism 204 in the loader unit 213 whose inside is maintained under the atmospheric ambience of clean air. Thereafter, a position alignment of the wafer W is carried out.

Next, the wafer W is loaded into any one of the load-lock units 243 and 244. After the load-lock unit is exhausted to vacuum, the etching process or the like can be carried out by loading the wafer W in the load-lock unit into a vacuum chamber 2 of any one of the process modules 261a to 261f via the transfer unit 263. Thereafter, the wafer W is loaded into any one of the load-lock units 243 and 244 via the transfer arm unit 268 again and, then, the inner space thereof is set to the atmospheric pressure. Next, the wafer W in the load-lock units 243 and 244 is unloaded therefrom by the wafer transfer mechanism 204 in the loader unit 213 and then accommodated in any one of the FOUPs 201. Such operation is carried out for the wafers W of one lot, and the processing of the same lot is completed.

In accordance with the vacuum processing system 200 configured as described above, since there are provided the MCs 305d to 305i for performing the control under the EC 301 as the general control unit, it is possible to control the conductance of the APC valve 21 and the switching between operations and stops of the turbo-molecular pump 22 and the dry pump 24 with high reliability based on the pressure measured inside the vacuum chamber 2 by the pressure gauge 25.

Hereinafter, a method for measuring a leak rate in the vacuum apparatus 1 will be described with reference to FIGS. 8 to 18. As described above, in the vacuum chamber 1, no gate valve is provided at an upstream side of the turbo-molecular pump 22. The gate valve is conventionally disposed to seal the vacuum chamber 2 in measuring a leak rate. In the vacuum apparatus 1 of FIG. 1, the leak rate can be measured by using the following methods.

First Embodiment

Figure 8:
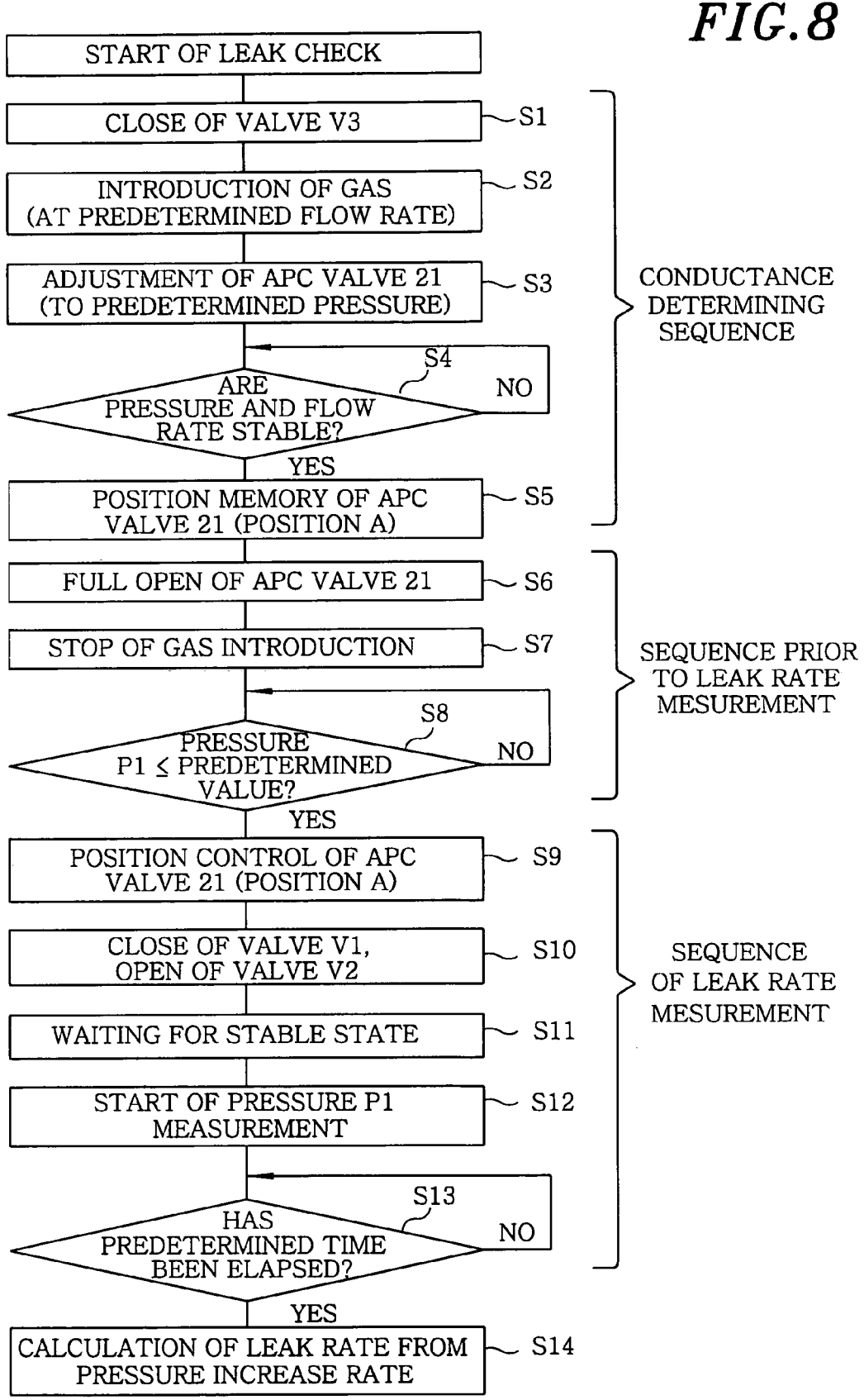
FIG. 8 is a flowchart showing an outline of a leak rate measuring method in accordance with a first preferred embodiment of the present invention.
Figure 9:
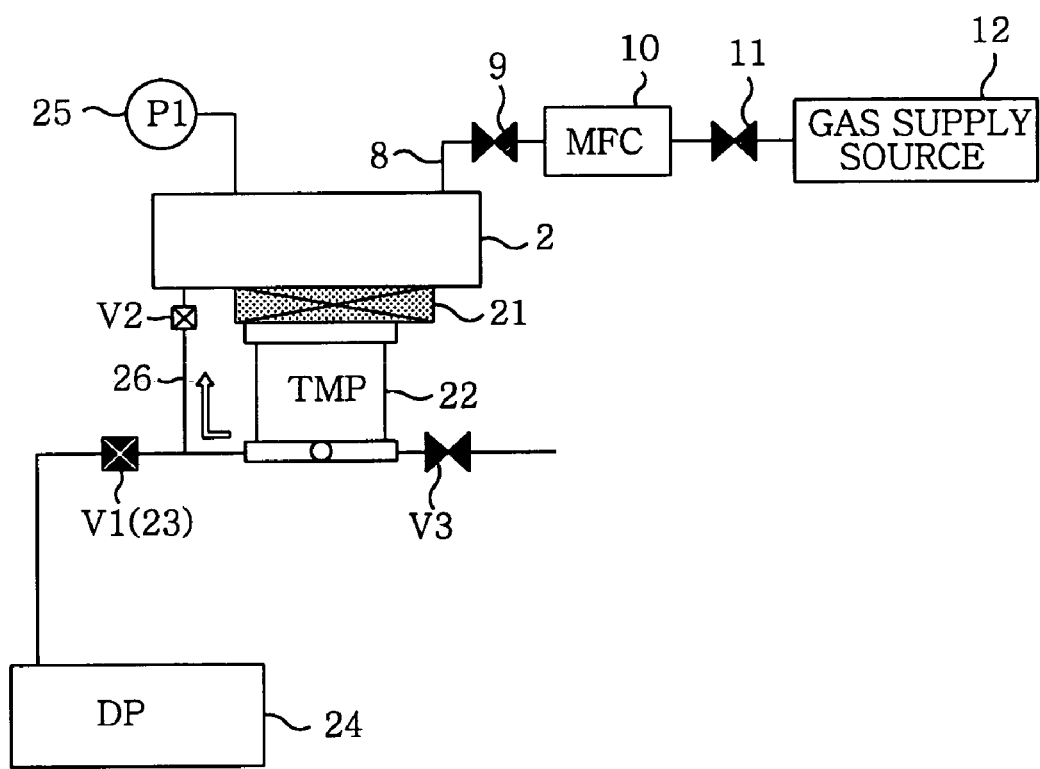
FIG. 9 presents a schematic diagram illustrating a state of a gas exhaust unit in the measurement of the leak rate in accordance with the first preferred embodiment of the present invention.

FIG. 8 is a flowchart showing a control sequence of measuring a leak rate by a leak rate measuring method in accordance with a first preferred embodiment of the present invention; and FIG. 9 presents an operational status of a gas exhaust unit in the measurement of the leak rate in accordance with the first preferred embodiment of the present invention. The open and the closed states of the valves are indicated in white and black color, respectively. Further, the dot-indication means that the valve is opened at a certain degree between the open state and the closed state (This also applies to FIGS. 12, 15 and 18). In a following description, the valve 23 as a second valve may be indicated as a valve V1 for the convenience.

In this embodiment, there is provided a circulation line 26 branched from a gas exhaust path between the turbo-molecular pump 22 and the valve V1 (the valve 23) and connected to the vacuum chamber 2 to communicate therewith. Further, the leak rate is measured by monitoring a pressure increase inside the vacuum chamber 2 due to a circulation of a leak gas.

Referring to FIG. 8, there are illustrated steps S1 to S5 as sequences for determining a conductance of the APC valve 21, steps S6 to S8 as preparatory sequences prior to measuring a leak rate and steps S9 to S14 as sequences for measuring the leak rate.

In this embodiment, before the leak is checked, the turbo-molecular pump 22 and the dry pump 24 are driven, and the APC valve 21 is fully opened. And, also, the valves V1 and V3 are opened, whereas the valve V2 is closed.

First of all, in the step S1, the valve V3 is closed. Next, for example, $N_2$ gas is introduced from the gas supply source 12 into the vacuum chamber 2 at a predetermined flow rate (step S2). In the step S3, an opening degree of the APC valve 21 is controlled so that an inner space of the vacuum chamber 2 is set to a predetermined pressure. In the step S4, it is checked whether or not the pressure and the flow rate inside the vacuum chamber 2 are stable with at controlled opening degree. As a result, in case the pressure and the flow rate are insufficiently stable (No), the measurement of the pressure and the flow rate is continued until they become more stable.

Meanwhile, in case it is determined in the step S4 that the pressure and the flow rate inside the vacuum chamber 2 are stable (Yes), the opening degree of the APC valve 21, e.g., a position of a valve body, is memorized as a position A (step S5).

In the step S6, the APC valve 21 is fully opened. Next, in the step S7, the introduction of $N_2$ gas from the gas supply source 12 is stopped. In such state, a pressure P1 inside the vacuum chamber 2 is monitored and, then, in the step S8, it is checked whether or not the pressure P1 is smaller than or equal to a predetermined value. As a result, if it is determined that the pressure P1 is greater than the predetermined value (No), the stop of the gas introduction is kept until the pressure P1 becomes smaller than or equal to the predetermined value. In the meantime, if it is determined in the step S8 that the pressure P1 is smaller than or equal to the predetermined value (Yes), the opening degree of the APC valve 21 is controlled to the position A memorized in the step S5 (step S9). Moreover, in the step S10, as illustrated in FIG. 9, a gas is introduced into the circulation line 26 by closing the valve V1 and opening the valve V2. In the step S11, a waiting state is continued until the gas circulation becomes stable and, then, in the step S12, the pressure P1 inside the vacuum chamber 2 is measured. In the step S13, it is checked whether or not a predetermined time has elapsed since the measurement is started in the step S12. If it is determined that the predetermined time has not elapsed (No), the measurement is continued. Meanwhile, if it is determined in the step S13 that the predetermined time has elapsed (Yes), the leak rate is calculated from a pressure increase rate during the measurement period (step S14).

Figure 10:
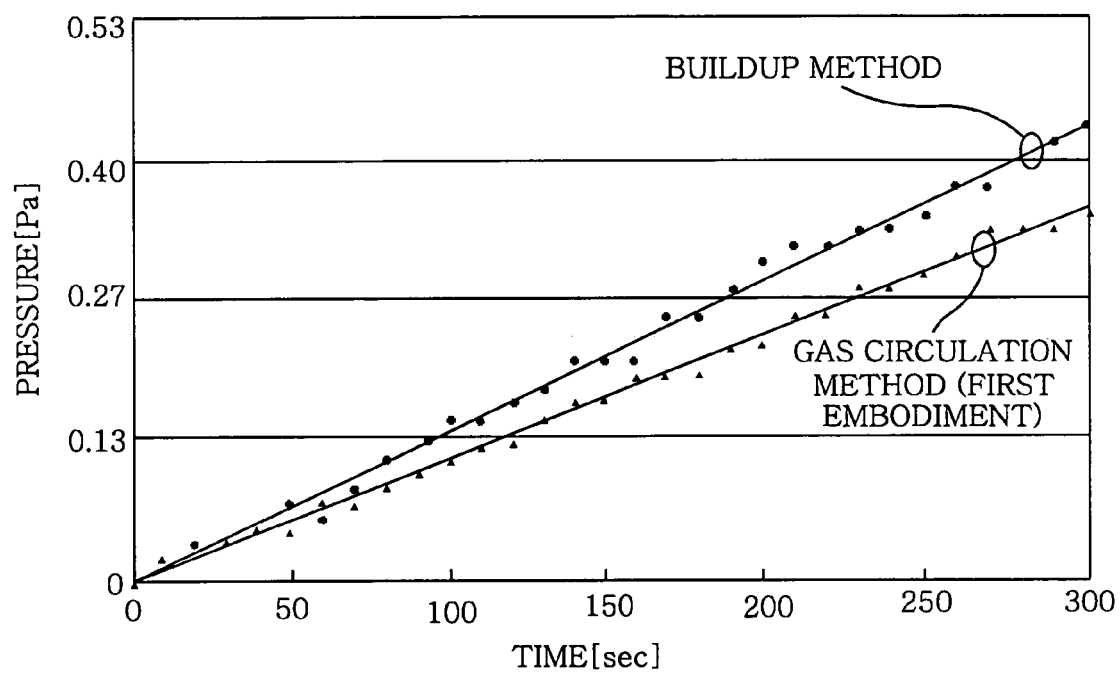
FIG. 10 provides a graph showing pressure changes in a vacuum chamber in the measurement of the leak rate in accordance with the first preferred embodiment of the present invention.

FIG. 10 shows a pressure change inside the vacuum chamber 2 measured through the aforementioned processes. Further, FIG. 10 also depicts a pressure change inside the vacuum chamber 2, which is measured by using a buildup method in case the APC valve having a gate valve function is disposed in the vacuum chamber 2 of FIG. 1. Referring to FIG. 10, there is illustrated a linear increase of the pressure inside the vacuum chamber 2 in the first preferred embodiment in which the pressure is measured by circulating the gas. A gradient of the straight line is different from the measurement result obtained by using the buildup method. However, by calculating a compensation coefficient in advance, an actual leak rate can be calculated from the pressure inside the vacuum chamber 2 measured by using the leak rate measuring method of the first preferred embodiment.

Second Embodiment

Figure 11:
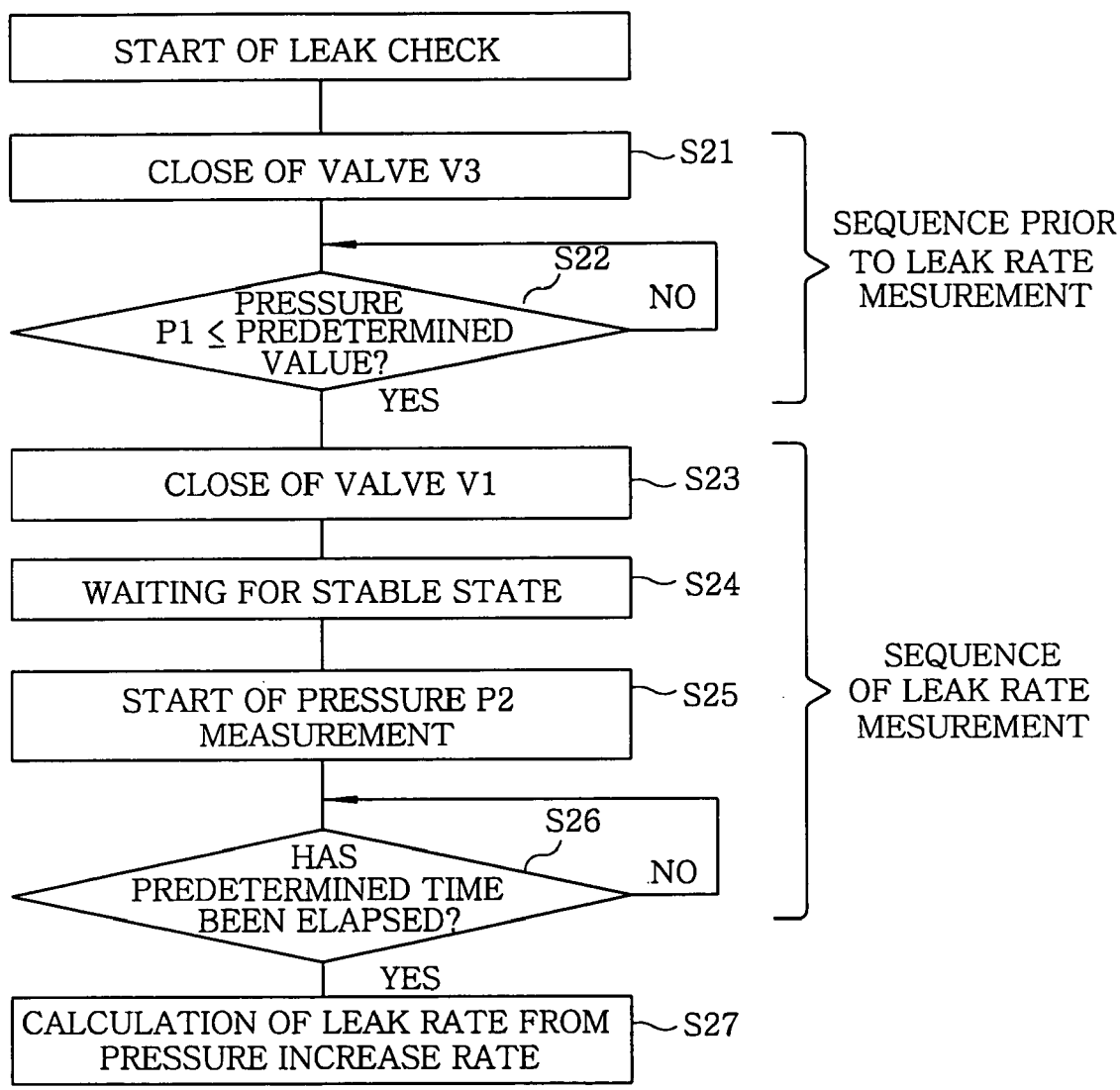
FIG. 11 represents a flowchart showing an outline of a leak rate measuring method in accordance with a second preferred embodiment of the present invention.
Figure 12:
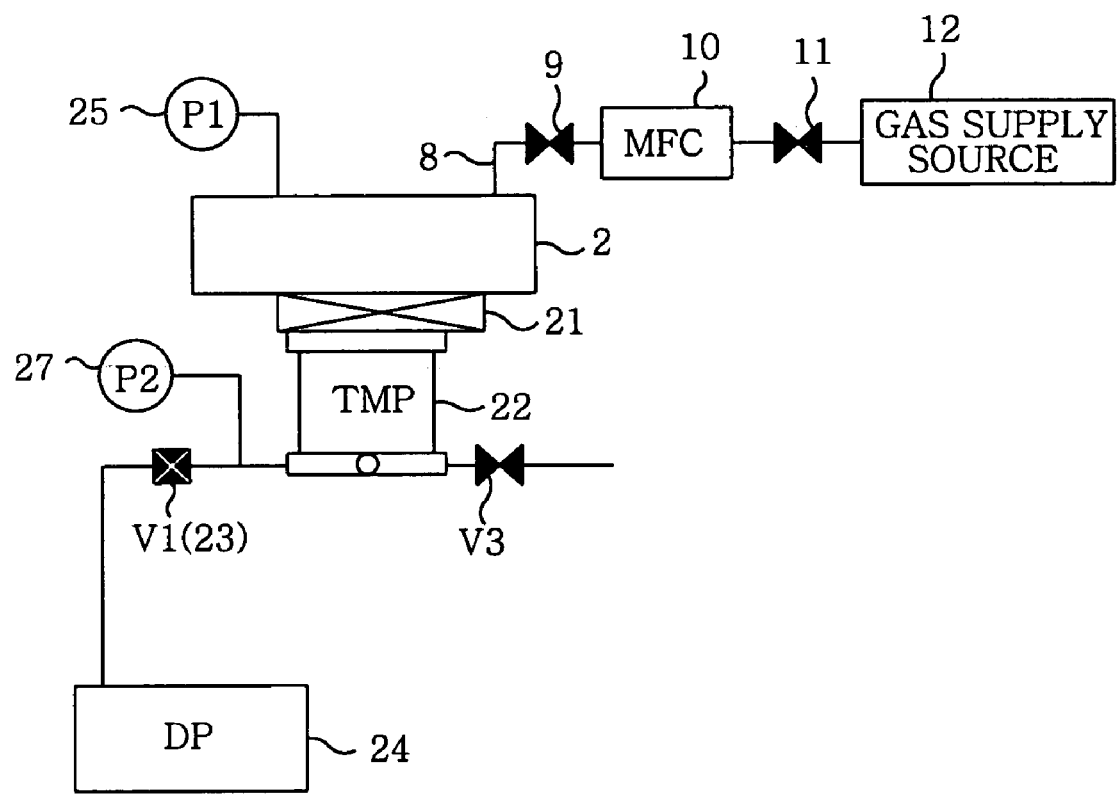
FIG. 12 describes a schematic diagram depicting a state of a gas exhaust unit in the measurement of a leak rate in accordance with the second preferred embodiment of the present invention.

FIG. 11 represents a flowchart showing a control sequence of measuring a leak rate by using a leak rate measuring method in accordance with a second preferred embodiment of the present invention. FIG. 12 illustrates an operational status of a gas exhaust unit in the measurement of the leak rate in accordance with the second preferred embodiment of the present invention. In this embodiment, a back pressure of the turbo-molecular pump 22, i.e., a pressure P2 inside a line between the turbo-molecular pump 22 and the valve V1, is monitored with the pressure gauge 27 disposed at the line between the turbo-molecular pump 22 and the valve V1 (the valve 23), thereby measuring the leak rate.

Referring to FIG. 11, there are illustrated steps S21 to S22 as preparatory sequences prior to measuring a leak rate, and steps S23 to S27 as sequences for measuring the leak rate.

In this embodiment, before the leak is checked, the turbo-molecular pump 22 and the dry pump 24 are driven, and the APC valve 21 is fully opened. And, also, the valves V1 and V3 are opened.

First of all, in the step S21, the valve V3 is closed. Next, in the step S22, it is checked whether or not the pressure P1 is smaller than or equal to a predetermined value by monitoring the pressure P1 inside the vacuum chamber 2. If it is determined that the pressure P1 is greater than the predetermined value (No), a decompression is performed until the pressure P1 becomes smaller than or equal to the predetermined value. On the other hand, if it is determined in the step S22 that the pressure P1 is smaller than or equal to the predetermined value (Yes), the valve V1 is closed in the step S23 as shown in FIG. 12. Moreover, in the step S24, a waiting state is continued until the pressure inside the line between the turbo-molecular pump 22 and the valve V1 becomes stable and, then, in the step S25, the pressure P2 is measured. Thereafter, in the step S26, it is checked whether or not the predetermined time has elapsed since the measurement is started in the step S25. If it is determined that the predetermine time has not elapsed (No), the measurement is continued. On the contrary, if it is determined in the step S26 that the predetermined time has elapsed (Yes), the leak rate is calculated from a pressure increase rate during the measurement period (step S27).

Figure 13:
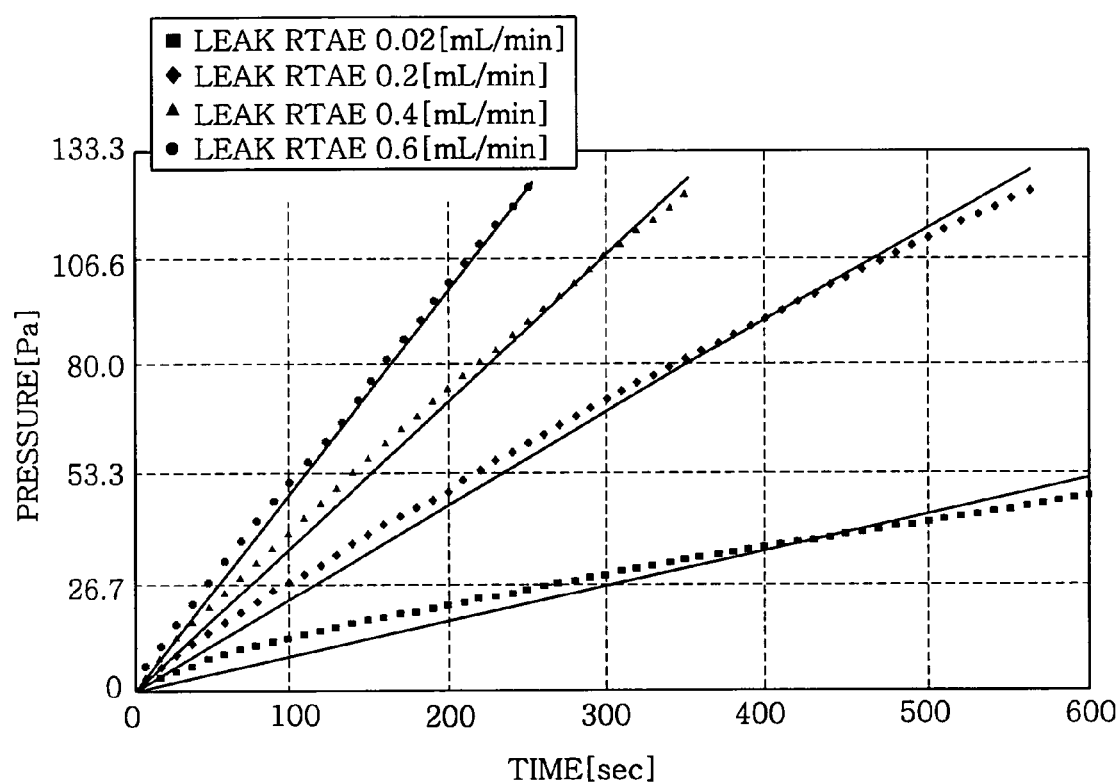
FIG. 13 is a graph showing pressure changes in a vacuum chamber in the measurement of the leak rate in accordance with the second preferred embodiment of the present invention.

FIG. 13 shows transitional changes of pressures P2 measured in case the flow rate controller 10 tentatively sets leak rates to be 0.02 mL/min(sccm), 0.2 mL/min(sccm), 0.4 mL/min(sccm) and 0.6 mL/min(sccm) while blocking a gas. In the respective leak rates, the measurement values of the pressures P2 change in approximately linearly. Accordingly, the leak rates can be comparatively checked by monitoring a back pressure at a downstream side of the turbo-molecular pump 22 in the gas flowing direction.

Third Embodiment

Figure 14:
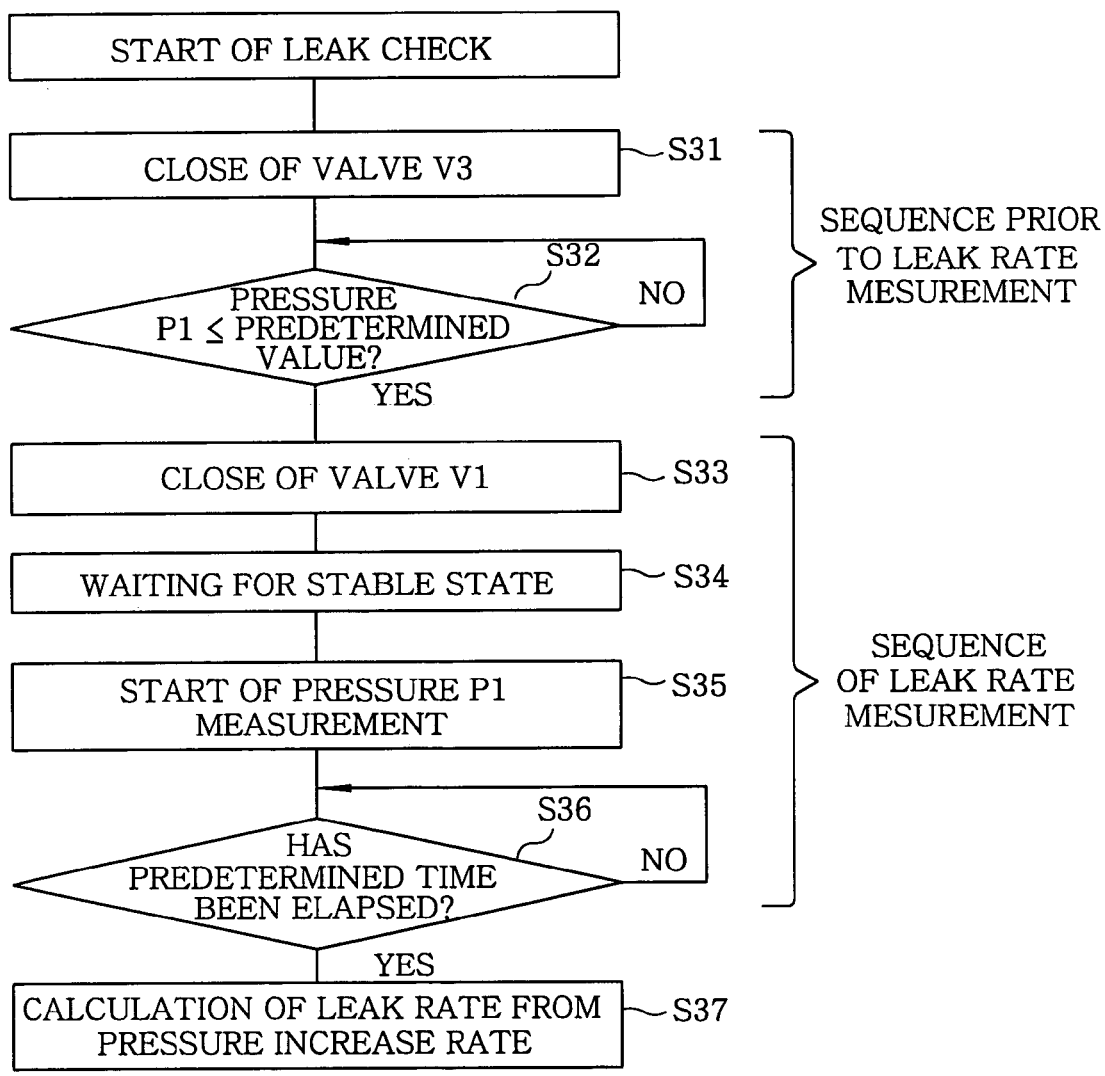
FIG. 14 offers a flowchart illustrating an outline of a leak rate measuring method in accordance with a third preferred embodiment of the present invention.
Figure 15:
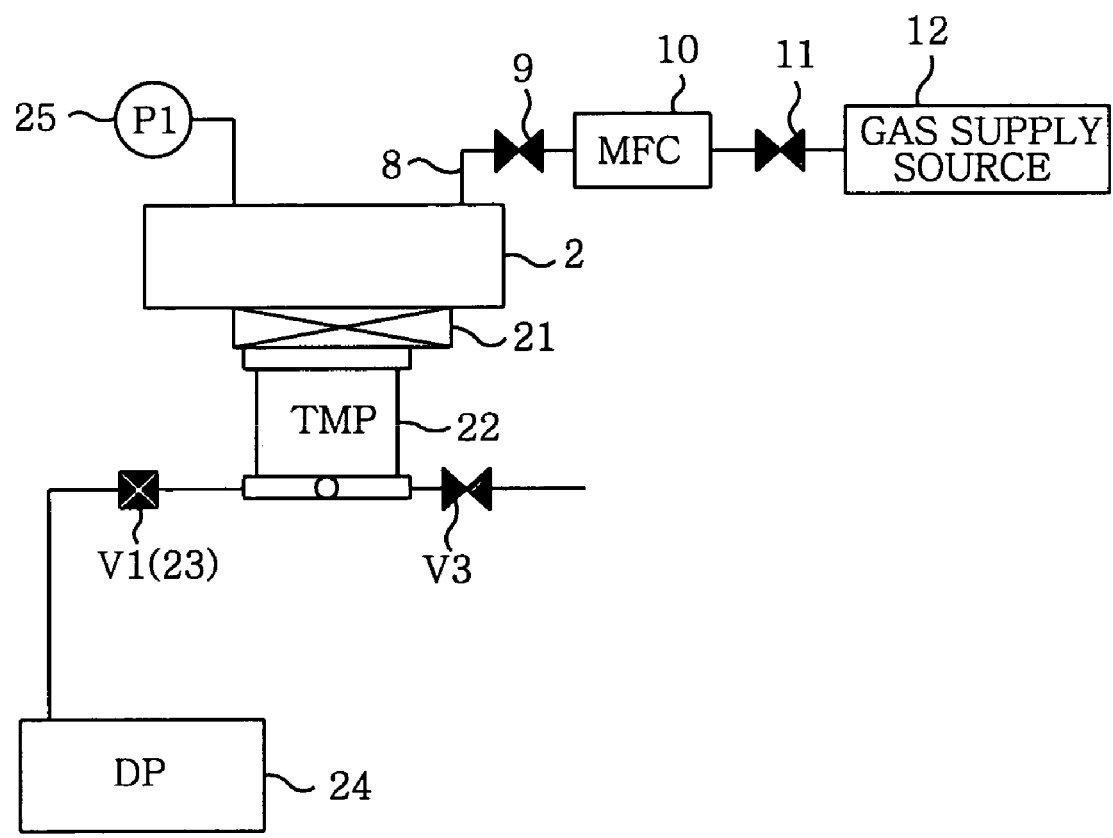
FIG. 15 provides a schematic diagram describing a state of a gas exhaust unit in the measurement of a leak rate in accordance with the third preferred embodiment of the present invention.

FIG. 14 offers a flowchart illustrating a control sequence of measuring a leak rate by a leak rate measuring method in accordance with a third preferred embodiment of the present invention; and FIG. 15 describes a state of a gas exhaust unit in the measurement of the leak rate in accordance with the third preferred embodiment of the present invention. In this embodiment, after stopping the turbo-molecular pump 22, a pressure increase inside the vacuum chamber 2 is monitored in a state where the vacuum chamber 2 is completely exhausted by the dry pump 24, thereby measuring a leak rate.

Referring to FIG. 14, there are illustrates steps S31 and S32 as preparatory sequences prior to measuring a leak rate and steps S33 to S37 as sequences for measuring the leak rate.

In this embodiment, before the leak is checked, the turbo-molecular pump 22 is stopped and the dry pump 24 is driven. Then, the APC valve 21 is fully opened and the valves V1 and V3 are opened.

First of all, in the step S31, the valve V3 is closed. Next, in the step S32, it is checked whether or not the pressure P1 is smaller than or equal to a predetermined value by monitoring the pressure P1 inside the vacuum chamber 2. If it is determined that the pressure P1 is not smaller than or equal to the predetermined value (No), a decompression is continued until the pressure P1 becomes smaller than or equal to the predetermined value. On the other hand, if it is determined in the step S32 that the pressure P1 is smaller than or equal to the predetermined value (Yes), the valve V1 is closed in the step S33 as shown in FIG. 15. Moreover, in the step S34, a waiting state is continued until the pressure inside the vacuum chamber 2 becomes stable and, then, in the step S35, the pressure P1 is measured. Further, in this embodiment, a pressure change in a total volume of the vacuum chamber 2 and the line from the APC valve 21 via turbo-molecular pump 22 to the valve V1 is monitored.

In the step S36, it is checked whether or not the predetermined time has elapsed since the measurement is started in the step S35. If it is determined that the predetermine time has not elapsed (No), the measurement is continued. On the contrary, if it is determined in the step S36 that the predetermined time has elapsed (Yes), the leak rate is calculated from a pressure increase rate during the measurement period (step S37).

Figure 16:
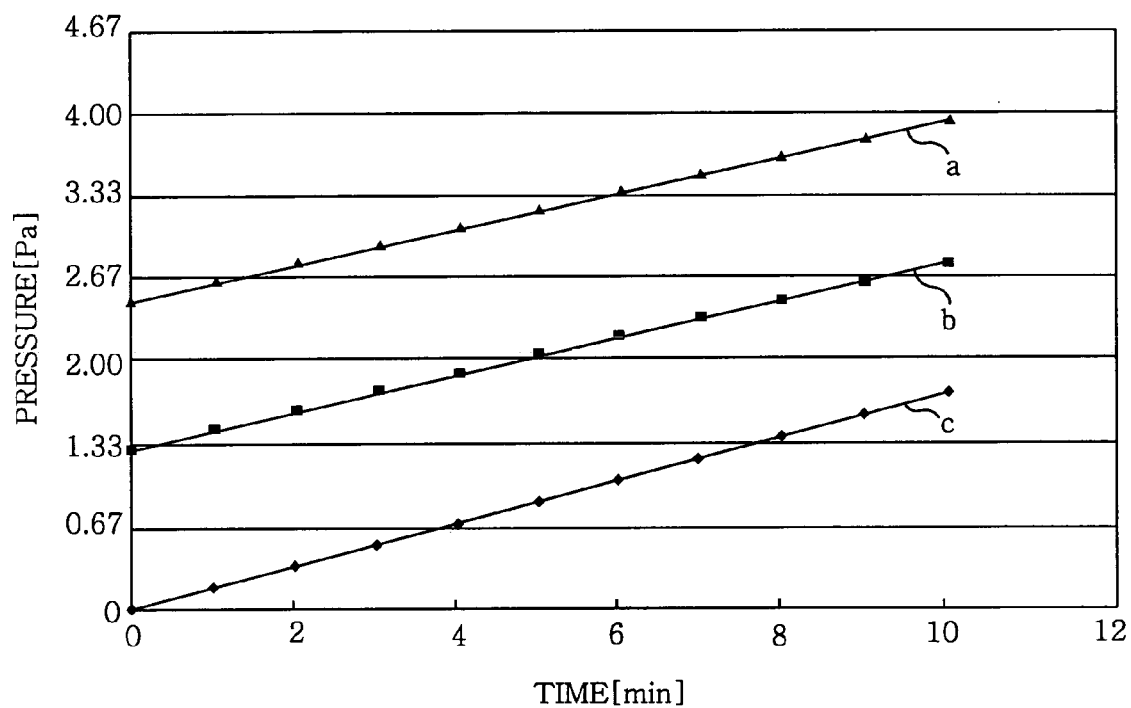
FIG. 16 represents a graph showing pressure changes in a vacuum chamber in the measurement of the leak rate in accordance with the third preferred embodiment of the present invention.

FIG. 16 illustrates a transitional change of a pressure P1 (straight line a) measured by the aforementioned processes. Further, FIG. 16 depicts measurement results obtained by using a buildup method in case an APC valve having a gate valve mechanism is substituted for the APC valve 21 of the vacuum apparatus 1 of FIG. 1 and is completely closed after performing a vacuum exhaust with the dry pump 24 (straight line b) and in case the APC valve having the gate valve mechanism is completely closed after performing the vacuum exhaust with the turbo-molecular pump 22 (straight line c).

Referring to FIG. 16, there are illustrated the straight lines a to c having different pressures at a time when the measurement is started. However, gradients of the straight lines a to c that correspond to an increasing rate of the pressure are 0.143, 0.149 and 0.170, respectively, which are approximated. In other words, similarly as in the buildup method (straight lines b and c), the leak rate measuring method of the third preferred embodiment indicates the leak rate. Accordingly, by employing the leak rate measuring method of the third preferred embodiment, the actual leak rate can be measured.

Fourth Embodiment

Figure 17:
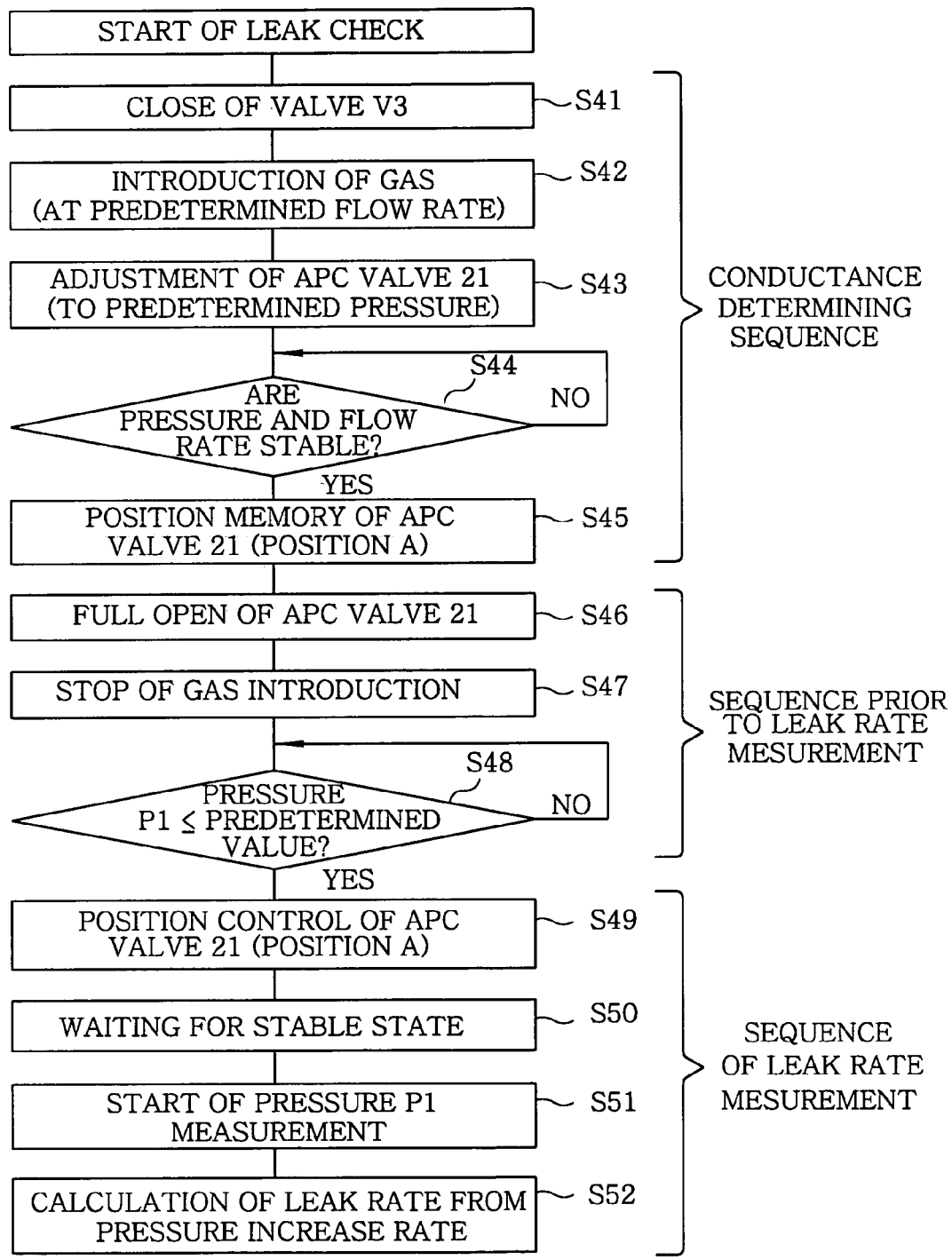
FIG. 17 sets forth a flowchart demonstrating a leak rate measuring method in accordance with a fourth preferred embodiment of the present invention.
Figure 18:
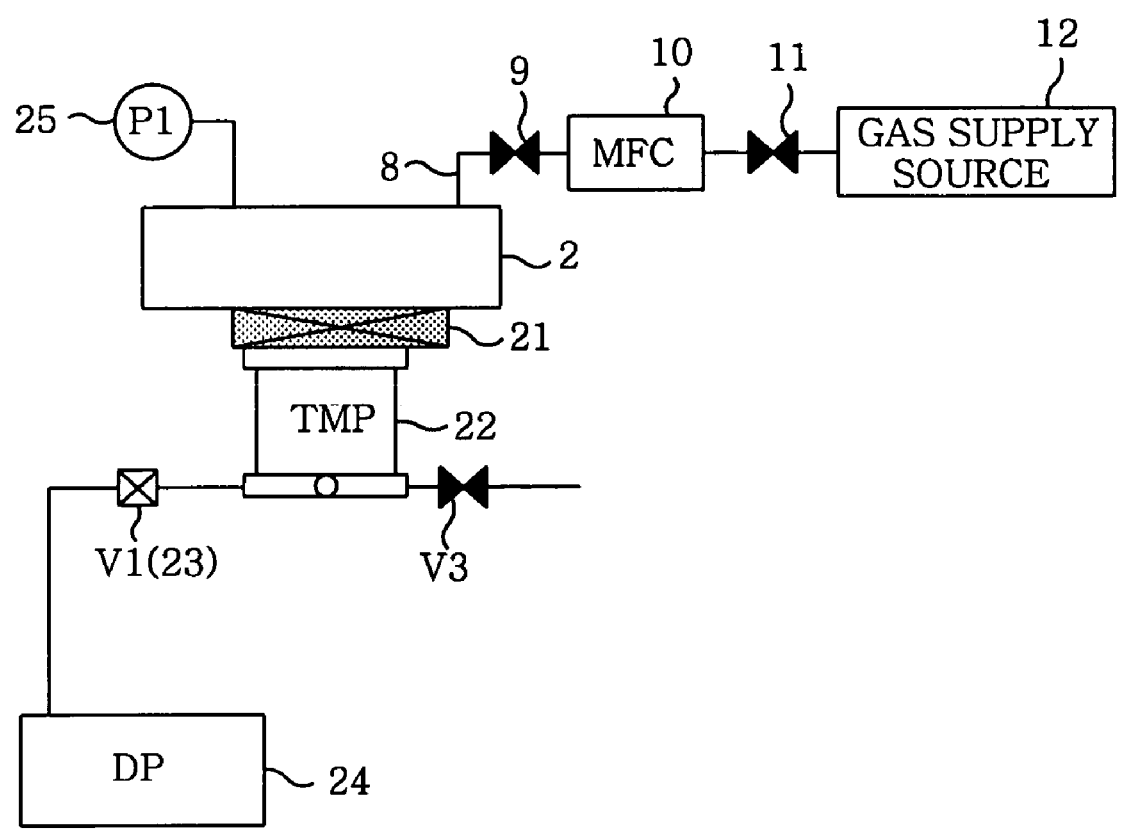
FIG. 18 is a schematic diagram illustrating a state of a gas exhaust unit in the measurement of the leak rate in accordance with the fourth preferred embodiment of the present invention.

FIG. 17 is a flowchart showing a control sequence of measuring a leak rate in accordance with a fourth preferred embodiment of the present invention; and FIG. 18 illustrates a state of a gas exhaust unit in the measurement of the leak rate in accordance with the fourth preferred embodiment of the present invention. In this embodiment, in a state where the APC valve 21 is set at a certain conductance, the turbo-molecular pump 22 is driven and, then, the pressure inside the vacuum chamber 2 is measured. Accordingly, the leak rate is measured.

Referring to FIG. 18, there are illustrated steps S41 to S45 as sequences for determining a conductance of the APC valve 21, steps S46 to S48 as preparatory sequences prior to measuring the leak rates and steps S49 to S52 as sequences for measuring the leak rates.

In this embodiment, before the leak is checked, the turbo-molecular pump 22 and the dry pump 24 are driven, and the APC valve 21 is fully opened. And, also, the valves V1 and V3 are opened.

First of all, in the step S41, the valve V3 is closed. Next, for example, $N_2$ gas is introduced from the gas supply source 12 into the vacuum chamber 2 at a predetermined flow rate (step S42). In the step S43, an opening degree of the APC valve 21 is controlled such that an inner space of the vacuum chamber 2 is under a predetermined pressure. And, also, in the step S44, it is checked whether or not the pressure and the flow rate inside the vacuum chamber 2 are stable. As a result, in case the pressure and the flow rate are insufficiently stable (No), the measurement of the pressure and the flow rate is continued until they become more stable.

Meanwhile, in case it is determined in the step S44 that the pressure and the flow rate inside the vacuum chamber 2 are stable (Yes), the opening degree thereof (e.g., a position A) is memorized in the step S45.

In the step S46, the APC valve 21 is fully opened. Next, in the step S47, the introduction of $N_2$ gas from the gas supply source 12 is stopped. In such state, a pressure P1 inside the vacuum chamber 2 is monitored and, then, in the step S48, it is checked whether or not the pressure P1 is smaller than or equal to a predetermined value. As a result, if it is determined that the pressure P1 is not smaller than or equal to the predetermined value (No), the stop of the gas introduction is kept until the pressure P1 becomes smaller than or equal to the predetermined value. In the meantime, if it is determined in the step S48 that the pressure P1 is smaller than or equal to the predetermined value (Yes), the opening degree of the APC valve 21 is controlled as the position A memorized in the step S45 (step S49). In the step S50, a waiting state is continued until the pressure P1 becomes stable and, then, in the step S51, the pressure P1 inside the vacuum chamber 2 is measured.

In this embodiment, the leak rate is calculated from a value of the measured pressure P1 (step S52). That is, in the step S52, the leak rate is calculated by comparing the measured pressure P1 with the pressure inside the vacuum chamber 2 which is pre-calculated at the predetermined opening degree (position A).

For example, in case the pressure increase rate inside the vacuum chamber 2 is 0.13 [Pa/min($1\times10^{-3}$ Torr/min)] and, further, a chamber volume is 50 [L], a specified leak rate is $6.58\times10^{-2}$ [ml/min(sccm)]. In case the conductance of the APC valve 21 is set in ten steps of 1 to 10 [L/sec] under the condition of such leak rate, the pressure values of the vacuum chamber at the respective conductance are calculated as in the following table 1.

TABLE 1

| Conductance [L/s] | Pressure inside chamber P1[Pa] | Remarks |
|---|---|---|
| 1 | 0.0111 | $8.33 \times 10^{-4}$ Torr |
| 2 | 0.0056 | $4.17 \times 10^{-4}$ Torr |

TABLE 1-continued

| Conductance [L/s] | Pressure inside chamber P1[Pa] | Remarks |
|---|---|---|
| 3 | 0.0037 | $2.78 \times 10^{-4}$ Torr |
| 4 | 0.0028 | $2.08 \times 10^{-4}$ Torr |
| 5 | 0.0022 | $1.67 \times 10^{-4}$ Torr |
| 6 | 0.0019 | $1.39 \times 10^{-4}$ Torr |
| 7 | 0.0016 | $1.19 \times 10^{-4}$ Torr |
| 8 | 0.0014 | $1.04 \times 10^{-4}$ Torr |
| 9 | 0.0012 | $9.26 \times 10^{-5}$ Torr |
| 10 | 0.0011 | $8.33 \times 10^{-5}$ Torr |

In such vacuum chamber 2, in case the APC valve 21 is opened at a certain opening degree such that the conductance becomes e.g., 5 [L/sec], the pressure inside the vacuum chamber 2 becomes 0.0022 Pa ($1.67 \times 10^{-4}$ Torr). Accordingly, the actual leak rate can be calculated from the pressure P1. In the fourth embodiment, a base pressure inside the vacuum chamber 2 is measured and, then, the leak rate is checked depending on a value of the base pressure. Consequently, it is preferable to set the conductance of the APC valve 21 to be small (i.e., small opening degree). As a result, the conductance of the APC valve 21 is preferably set within the range of 1 to 10 [L/sec], for example, and, more preferably, within the range of 1 to 5 [L/sec].

As described above, even in the vacuum apparatus 1 having no gate valve (or APC valve having a gate valve mechanism), the leak rate can be measured by performing the processes of the first to the fourth embodiment.

Further, the present invention may be variously modified without being limited to the aforementioned embodiments. For instance, although the parallel plate type plasma etching apparatus has been described as an example in the embodiment of FIG. 1, the present invention may be applied to various plasma etching apparatuses such as a magnetron RIE plasma etching apparatus using a permanent magnet, an inductively coupled plasma etching apparatus and the like. Moreover, the present invention can be applied to various semiconductor manufacturing apparatuses, e.g., a film forming apparatus, which require processes to be performed under a high vacuum state, without being limited to the etching apparatus.

The object of the present invention is achieved in such a way that the CPU of the EC 301 reads and executes program codes of software, for implementing functions of the aforementioned embodiments, stored in a storage medium. In this case, the aforementioned embodiments are implemented by the program codes themselves read from the storage medium. Thus, the program codes and the storage medium storing the same constitute the present invention. Furthermore, the storage medium for supplying the program codes may include a flexible disk, a hard disk, a magneto-optical disk, a CD-ROM, a CD-R, a CD-RW, a DVD-ROM, a DVD-RAM, a DVD-RW, a DVD+RW, a magnetic tape, a non-volatile memory card, a ROM and the like. In addition, the program code may be downloaded through a network.

Further, the functions of the aforementioned embodiments are achieved not only by executing the program codes read by the CPU but also by implementing a partial or an entire actual processing based on instructions of the program codes with the help of, e.g., an operating system (OS) working in the CPU board.

In addition, the functions of the aforementioned embodiments can be implemented by recording the program codes read by the storage medium in a memory having a function extension board inserted in the EC 301 or a function extension unit connected to the EC 301 and then performing a partial or an entire actual processing with the help of a CPU or the like provided in the function extension board or in the function extension unit based on the instructions of the program codes.

The program codes may include object codes, program codes implemented by an interpreter, script data supplied to the OS and the like.

While the invention has been shown and described with respect to the preferred embodiments, it will be understood by those skilled in the art that various changes and modification may be made without departing from the scope of the invention as defined in the following claims.

What is claimed is:

1. A vacuum apparatus comprising:
   a vacuum chamber in which an object is accommodated to be processed;
   a first gas exhaust pump connected to the vacuum chamber via a first valve serving as a conductance variable valve having no gate valve mechanism;
   a second valve connected to a downstream side of the first gas exhaust pump in a gas flowing direction; and
   a controller which closes the second valve while measuring a leak rate of the vacuum apparatus.

2. The vacuum apparatus of claim 1, further comprising a second gas exhaust pump connected to a downstream side of the second valve in the gas flowing direction.

3. The vacuum apparatus of claim 2, wherein the first gas exhaust pump is a turbo-molecular pump, and the second gas exhaust pump is a dry pump.

4. The vacuum apparatus of claim 2, further comprising a pressure gauge for measuring a pressure inside the vacuum chamber,
   wherein the controller controls the second valve to be closed after depressurizing an inner space of the vacuum chamber with the second gas exhaust pump to a pressure equal to or less than a predetermined level and then the pressure inside the vacuum chamber to be monitored by the pressure gauge under the condition that the first valve is fully opened and the first gas exhaust pump is stopped.

5. The vacuum apparatus of claim 1, wherein the first valve has a valve body composed of a pair of approximately semi-circular symmetric plates, and a conductance of the first valve is variable by rotating the pair of plates about linear sides thereof to adjust an opening degree.

6. The vacuum apparatus of claim 1, further comprising a pressure gauge, disposed at a gas exhaust path between first gas exhaust pump and the second valve, for monitoring a pressure inside the gas exhaust path,
   wherein the controller controls the second valve to be closed and the pressure inside the gas exhaust path to be monitored by the pressure gauge under the condition that the first valve is fully opened and the first gas exhaust pump is operated.

7. A vacuum apparatus comprising:
   a vacuum chamber in which an object is accommodated to be processed;
   a first gas exhaust pump connected to the vacuum chamber via a first valve serving as a conductance variable valve having no gate valve mechanism;
   a second valve connected to a downstream side of the first gas exhaust pump in a gas flowing direction; and a circulating path branched from a gas exhaust path between the first gas exhaust pump and the second valve, the circulating path being connected to the vacuum chamber to communicate therewith.

8. The vacuum apparatus of claim 7, further comprising a pressure gauge for measuring a pressure inside the vacuum chamber and a controller for measuring a leak rate of the vacuum apparatus, wherein the controller controls the first gas exhaust pump to circulate a gas into the vacuum chamber through the circulating path and the pressure inside the vacuum chamber to be monitored by the pressure gauge under the condition that the first valve is set at a predetermined conductance and the second valve is closed.

9. The vacuum apparatus of claim 7, further comprising a second gas exhaust pump connected to a downstream side of the second valve in the gas flowing direction.

10. The vacuum apparatus of claim 9, wherein the first gas exhaust pump is a turbo-molecular pump, and the second gas exhaust pump is a dry pump.

11. The vacuum apparatus of claim 7, wherein the first valve has a valve body composed of a pair of approximately semicircular symmetric plates, and a conductance of the first valve is variable by rotating the pair of plates about linear sides thereof to adjust an opening degree.

* * * * *